US009566976B2

(12) United States Patent
Fujishiro et al.

(10) Patent No.: US 9,566,976 B2
(45) Date of Patent: Feb. 14, 2017

(54) HYBRID VEHICLE

(71) Applicant: HONDA MOTOR CO., LTD., Tokyo (JP)

(72) Inventors: Naoki Fujishiro, Saitama (JP); Masanori Matsushita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/427,265

(22) PCT Filed: Aug. 28, 2013

(86) PCT No.: PCT/JP2013/072969
§ 371 (c)(1),
(2) Date: Mar. 10, 2015

(87) PCT Pub. No.: WO2014/042007
PCT Pub. Date: Mar. 20, 2014

(65) Prior Publication Data
US 2015/0224981 A1 Aug. 13, 2015

(30) Foreign Application Priority Data
Sep. 11, 2012 (JP) ................................ 2012-200011
Sep. 11, 2012 (JP) ................................ 2012-200012

(51) Int. Cl.
*B60W 10/06* (2006.01)
*B60W 10/08* (2006.01)
(Continued)

(52) U.S. Cl.
CPC ................ *B60W 20/10* (2013.01); *B60K 6/46* (2013.01); *B60L 7/14* (2013.01); *B60L 7/18* (2013.01);
(Continued)

(58) Field of Classification Search
CPC .............. B60K 6/46; B60L 7/18; B60L 11/14; B60L 7/14; B60L 7/26; B60L 11/12; B60L 11/1862; B60L 15/2009; B60W 10/08; B60W 10/26; B60W 20/10; B60W 10/18; B60W 20/00; B60W 10/06; B60W 20/14
(Continued)

(56) References Cited

U.S. PATENT DOCUMENTS

2001/0020554 A1* 9/2001 Yanase .................... B60K 6/46 180/65.245
2010/0292902 A1* 11/2010 Bach ........................ B60T 8/24 701/70
2011/0000725 A1 1/2011 Murota et al.

FOREIGN PATENT DOCUMENTS

DE 4446485 A1 6/1996
EP 0754588 A1 1/1997
(Continued)

OTHER PUBLICATIONS

Extended (Supplementary) European search report (EESR) dated Mar. 11, 2016, issued in counterpart European Patent Application No. 13837191.9. (7 pages).
(Continued)

*Primary Examiner* — Nga X Nguyen
(74) *Attorney, Agent, or Firm* — Westerman, Hattori, Daniels & Adrian, LLP

(57) ABSTRACT

A hybrid vehicle has a rechargeable battery, an internal combustion, a generator, and a control unit that controls the driving of the hybrid vehicle. The control unit determines a utilization mode of regenerated energy in the hybrid vehicle, according to a charged ratio of the battery and a braking force of the hybrid vehicle, from a first mode in which the regenerated energy is charged in the battery, a second mode in which the regenerated energy is consumed to drive the
(Continued)

generator with the internal combustion engine as a load, and a third mode in which a part of the regenerated energy is charged in the battery and the remainder is consumed to drive the generator.

12 Claims, 20 Drawing Sheets

(51) Int. Cl.

| | |
|---|---|
| ***B60W 10/18*** | (2012.01) |
| ***B60W 10/26*** | (2006.01) |
| ***B60W 20/00*** | (2016.01) |
| ***B60K 6/46*** | (2007.10) |
| ***B60L 7/18*** | (2006.01) |
| ***B60L 11/14*** | (2006.01) |
| ***B60L 7/14*** | (2006.01) |
| ***B60L 7/26*** | (2006.01) |
| ***B60L 11/12*** | (2006.01) |
| ***B60L 11/18*** | (2006.01) |
| ***B60L 15/20*** | (2006.01) |

(52) U.S. Cl.

CPC .................. *B60L 7/26* (2013.01); *B60L 11/12* (2013.01); *B60L 11/14* (2013.01); *B60L 11/1862* (2013.01); *B60L 15/2009* (2013.01); *B60W 10/06* (2013.01); *B60W 10/08* (2013.01); *B60W 10/18* (2013.01); *B60W 10/26* (2013.01); *B60W 20/00* (2013.01); *B60W 20/14* (2016.01); *B60L 2240/12* (2013.01); *B60L 2240/423* (2013.01); *B60L 2240/443* (2013.01); *B60L 2240/547* (2013.01); *B60L 2240/549* (2013.01); *B60L 2250/26* (2013.01); *B60L 2270/142* (2013.01); *B60W 2510/244* (2013.01); *B60W 2550/142* (2013.01); *B60W 2710/18* (2013.01); *B60Y 2400/114* (2013.01); *Y02T 10/6217* (2013.01); *Y02T 10/645* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/72* (2013.01); *Y02T 10/7275* (2013.01); *Y10S 903/93* (2013.01); *Y10S 903/947* (2013.01)

(58) Field of Classification Search

USPC ................ 701/22; 180/65.265; 903/930, 947

See application file for complete search history.

(56) References Cited

FOREIGN PATENT DOCUMENTS

| | | | |
|---|---|---|---|
| EP | 2460679 | A1 | 6/2012 |
| JP | 04-322105 | A | 11/1992 |
| JP | 2000-291451 | A | 10/2000 |
| JP | 2002-238105 | A | 8/2002 |
| JP | 2010-141997 | A | 6/2010 |
| JP | 2011-011714 | A | 1/2011 |
| JP | 2012-6525 | A | 1/2012 |

OTHER PUBLICATIONS

International Search Report dated Nov. 19, 2013, issued in corresponding application No. PCT/JP2013/072969.

* cited by examiner

HYBRID VEHICLE

TECHNICAL FIELD

The present invention relates to a hybrid vehicle.

BACKGROUND ART

A HEV (Hybrid Electrical Vehicle) includes a motor and an internal combustion engine, and runs based on a driving force of the motor and/or the internal combustion engine depending upon the driving conditions of the vehicle. HEVs are divided roughly into two system types; a series system and a parallel system. A series system HEV runs based on power of the motor. The internal combustion engine is used to generate electrical power. The electrical power generated in a generator by means of power of the internal combustion engine is used to charge a battery or supplied to the motor. A parallel system HEV runs based on a driving force of either or both of the motor and the internal combustion engine. A series/parallel system HEV is also known in which both the systems are combined. In the series/parallel system HEV, a clutch is released or applied (disengaged or engaged) according to the driving conditions of the vehicle, whereby a transmission system of driving force is switched to either the series system or the parallel system.

In the HEV, in order to obtain a braking force that corresponds to a braking force obtained by an engine brake, regenerative braking is used in which the motor is caused to function as a generator while the vehicle is being decelerated. Regenerated energy that is obtained during the regenerative braking is generated for a braking force that is needed by the vehicle that is running, and therefore, it is not possible to control the amount of regenerated energy. Although the regenerated energy is used to charge the battery, the battery that is fully charged cannot absorb the regenerated energy.

FIG. 20 is a block diagram of a regenerated energy absorbing system of a hybrid vehicle described in patent literature 1. In the regenerated energy absorbing system shown in FIG. 20, an electronic control unit 4 detects that regenerative braking is activated from a signal sent from a brake switch 9. Then, when the regenerative braking is in operation, an inverter 6 is controlled so that regenerated energy generated in a motor 7 is used to charge a battery 5. However, in the case a voltage of the battery 5 is detected by a voltmeter 12 to be found that the voltage detected is equal to or larger than a predetermined value, the supply of fuel to an engine 1 is stopped, and the inverter 6 is activated so that a generator 2 is activated to operate as a motor that rotates the engine 1 as a load by means of the regenerated energy to thereby absorb the regenerated energy.

RELATED ART LITERATURE

Patent Literature

Patent Literature 1: JP-H04-322105-A1

SUMMARY OF THE INVENTION

Problem that the Invention is to Solve

In the hybrid vehicle described in patent literature 1 in which the regenerated energy absorbing system described above is installed, in the case the voltage of the battery 5 is smaller than the predetermined value, the regenerated energy is used to charge the battery 5, whereas in the case the voltage of the battery 5 is equal to or larger than the predetermined value, the regenerated energy is absorbed by driving the generator 2 with the engine 1 caused to function as a load therefor. Therefore, in patent literature 1, it is described that the overcharge of the battery 5 by the excessive regenerated energy can be prevented while ensuring an effective braking force.

However, the absorbing method of regenerated energy changes when the voltage of the battery 5 passes the predetermined value while the hybrid vehicle is being decelerated, and therefore, the driver comes to feel that the deceleration is not constant. For example, in the event that the absorption rate of regenerated energy resulting when the voltage of the battery 5 is equal to or larger than the predetermined value is lower than that resulting when the voltage of the battery 5 is smaller than the predetermined value, in the case the voltage of the battery 5 is increased to be equal to or larger than the predetermined value while the vehicle is being decelerated, the driver will feel that the braking force decreases all of sudden.

In the hybrid vehicle described in patent literature 1 in which the regenerated energy absorbing system described above is installed, in the case the voltage of the battery 5 is equal to or larger than the predetermined value, the regenerated energy is absorbed by driving the generator 2 with the engine 1 caused to function as a load therefor. As this occurs, it is considered that the rotation speed of the engine 1 changes according to the amount of regenerated energy. Consequently, for example, even though the driver applies the brakes constantly, there can occur a situation in which the rotation speed of the engine 1 fluctuates due to a change in amount of regenerated energy. When the sound of the rotating engine 1 changes, the driver tends to believe mistakenly that the deceleration speed has changed. Because of this, in the case the rotation speed of the engine 1 fluctuates while the driver is applying the brakes constantly, the driver has inharmonious feeling about the change in sound of the rotating engine 1.

An object of the invention is to provide a hybrid vehicle that prevents a driver from having inharmonious feeling while the hybrid vehicle is decelerated.

Means for Solving the Problem

With a view to achieving the object by solving the problem described above, according to a first aspect of the invention, there is provided a hybrid vehicle, having:

a rechargeable battery (for example, batteries 1101, 2101 in embodiments) which supplies electric power to a motor that is a drive source of the hybrid vehicle, an internal combustion engine (for example, internal combustion engines 1109, 2109 in the embodiments), a generator (for example, generators 1111, 2111 in the embodiments) which supplies electric power generated by means of power from the internal combustion engine to the motor or the battery, the motor (for example, motors 1107, 2107 in the embodiments) which is driven by electric power from at least one of the battery and the generator, and a control unit (for example, management ECUs 1119, 2119 in the embodiments) which controls a drive of the hybrid vehicle that is driven by power from at least one of the motor and the internal combustion engine, wherein the control unit has a utilization mode determination portion (for example, a utilization mode determination portion 1155 in the embodiment) which determines a utilization mode of regenerated energy in the hybrid vehicle, according to a charged ratio of the battery and a braking force of the hybrid vehicle, from among a first mode (for example, modes A1, A2 in the embodiments) in which the regenerated energy is charged in the battery, a second mode (for example, modes B1, B2 in the embodiments) in which the regenerated energy is consumed to drive the generator with the internal combustion engine as a load, and a third mode (for example, modes C1, C2 in the embodiments) in which a part of the regenerated energy is charged in the battery and the remainder is consumed to drive the generator.

According to a second aspect of the invention, there is provided the hybrid vehicle, wherein the utilization mode determination portion determines that the utilization mode of the regenerated energy to be the third mode in a case, when the charged ratio of the battery is equal to or larger than a first threshold, where a braking force of the decelerating hybrid vehicle that is realized in the first mode is higher than a limit of a braking force of the decelerating hybrid vehicle that can be realized in the second mode, and the control unit has a utilization ratio control portion (for example, a utilization ratio control portion 1157 in the embodiment) which controls a utilization ratio of the regenerated energy in order that a portion of the regenerated energy that is used to drive the generator increases gradually as the charged ratio of the battery increases, when the utilization mode of the regenerated energy is the third mode.

According to a third aspect of the invention, there is provided the hybrid vehicle, wherein when the hybrid vehicle decelerates and descends a falling slope, the control unit controls the braking force of the hybrid vehicle in order that the braking force is increased according to a gradient of the slope, and when the charged ratio of the battery is equal to or larger than the first threshold, the braking force controlled to be increased of the hybrid vehicle where the utilization mode of the regenerated energy is determined to be the first mode is restricted to be equal to or smaller than the limit of the braking force of the hybrid vehicle that can be realized in the second mode.

According to a fourth aspect of the invention, there is provided the hybrid vehicle, having two shift ranges having different braking forces when the hybrid vehicle naturally decelerates on the falling slope, wherein the utilization mode determination portion determines that the utilization mode of the regenerated energy to be the third mode when a shift range having a larger braking force is selected.

According to a fifth aspect of the invention, there is provided the hybrid vehicle, wherein the utilization mode determination portion determines that the utilization mode of the regenerated energy to be the second mode when the charged ratio of the battery is equal to or larger than a second threshold that is higher than the first threshold.

According to a sixth aspect of the invention, there is provided the hybrid vehicle, having a braking unit (for example, a mechanical brake 2118 in the embodiments) which mechanically generates a braking force of the hybrid vehicle, wherein when the utilization mode of the regenerated energy of the decelerating hybrid vehicle is the first mode, the control unit increases a ratio of a braking force component by the braking unit out of a braking force of the hybrid vehicle so as to limit a braking force component by the first mode and thereafter changes the utilization mode of the regenerated energy to the second mode or the third mode, when the charged ratio of the battery is equal to or larger than a first threshold.

According to a seventh aspect of the invention, there is provided the hybrid vehicle, wherein when the braking force component by the first mode is limited, the control unit increases the ratio of the braking force component by the braking unit according to an increase of the charged ratio of the battery whereas decreasing an amount of the regenerated energy that is generated in the motor.

According to an eighth aspect of the invention, there is provided the hybrid vehicle, wherein in a case where the amount of the regenerated energy that is generated in the motor become 0, the utilization mode determination portion determines the utilization mode of the regenerated energy to be the second mode.

According to a ninth aspect of the invention, there is provided the hybrid vehicle, wherein in a case where a predetermined ratio of a whole braking force of the hybrid vehicle can be obtained by the braking unit, the utilization mode determination portion determines the utilization mode of the regenerated energy to be the third mode.

According to a tenth aspect of the invention, there is provided the hybrid vehicle, wherein when the charged ratio of the battery reaches a second threshold that is higher than the first threshold, the control unit controls a utilization ratio of the regenerated energy in the third mode in order that a ratio used to drive the generator gradually increases.

According to an eleventh aspect of the invention, there is provided the hybrid vehicle, wherein when the charged ratio of the battery reaches a third threshold that is higher than the second threshold, the control unit increases the ratio of the braking force component by the braking unit, and the utilization mode determination portion determines the utilization mode of the regenerated energy to be the second mode.

According to a twelfth aspect of the invention, there is provided the hybrid vehicle, wherein a rotation speed of the internal combustion engine is constant after the utilization mode of the regenerated energy is changed to the second mode or the third mode.

According to a thirteenth aspect of the invention, there is provided the hybrid vehicle, wherein when the charged ratio of the battery is smaller than a first threshold, the utilization mode determination portion determines the utilization mode of the regenerated energy to be the first mode.

Advantage of the Invention

According to the hybrid vehicle of the invention that is described in the first second, third, fourth, fifth and thirteenth aspects of the invention, irrespective of the stage of charge of the battery, the driver is prevented from having inharmonious feeling like that the braking force changes all of sudden while the hybrid vehicle is being decelerated.

According to the hybrid vehicle of the invention described in the third aspect of the invention, the braking force is controlled to be increased according to the gradient of the falling slope while preventing the driver from having to feel inharmonious feeling.

According to the hybrid vehicle of the invention described in the fourth aspect of the invention, the shift range can be limited to the shift range with which it is highly possible that the driver feels inharmonious feeling.

According to the hybrid vehicle of the invention described in the first sixth seventh, eighth, ninth, tenth, eleventh and twelfth aspects of the invention, the rotation speed of the internal combustion engine does not fluctuate while the hybrid vehicle is being decelerated, and therefore, the driver is prevented from having inharmonious feeling.

According to the hybrid vehicle of the invention described in the seventh aspect of the invention, the ratio of the braking force component by the braking unit can be gradually increased.

According to the hybrid vehicle of the invention described in the ninth, tenth, and eleventh aspects of the invention, the ratio of the braking force component by the braking unit changes in two stages, and therefore, a change rate per unit time from the braking by the regenerative braking in the motor to the braking by the braking unit can be made small. As a result, the vehicle is decelerated without making the driver have inharmonious feeling.

According to the hybrid vehicle of the invention described in the twelfth aspect of the invention, the rotation speed of the internal combustion engine is constant without being affected by the braking force that is generated by an operation of the brakes by the driver, and therefore, the driver does not have inharmonious feeling.

MODE FOR CARRYING OUT THE INVENTION

Hereinafter, embodiments of the invention will be described by reference to the drawings.

First Embodiment

Figure 1:
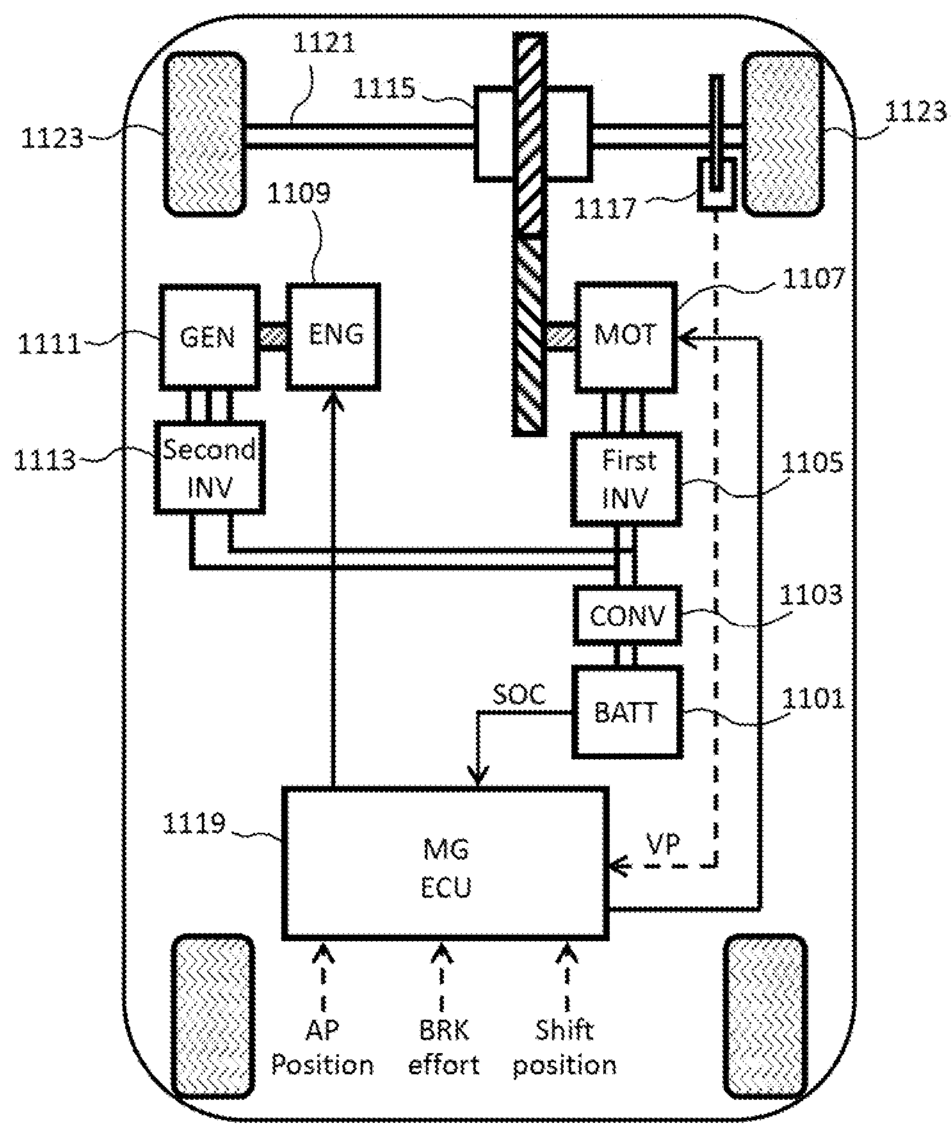
FIG. 1 is a block diagram showing an internal configuration of a series system HEV.

FIG. 1 is a block diagram showing an internal configuration of a series system HEV. As shown in FIG. 1, a series/parallel system HEV (hereinafter, referred to simply as a "vehicle") includes a battery (BATT) 1101, a converter (CONV) 1103, a first inverter (first INV) 1105, a motor (Mot) 1107, an internal combustion engine (ENG) 1109, a generator (GEN) 1111, a second inverter (second INV) 1113, a gearbox (hereinafter, referred to simply as a "gear") 1115, a vehicle speed sensor 1117, and a management ECU (MG ECU) 1119. Arrows shown in FIG. 1 by a dotted line indicate flows of value data, and arrows shown by a solid line indicate flows of control signals that signal the contents of instructions.

The battery 1101 has a plurality of battery cells that are connected in series and supplies a high voltage in the range of, for example, 100 to 200V. The battery cells are, for example, lithium ion battery cells or nickel-metal hydride battery cells. The converter 1103 increases or decreases a direct current output voltage of the battery 1101 as the direct current is. The first inverter 1105 converts direct current voltage into alternating current voltage to supply a three-phase current to the motor 1107. The first inverter 1105 also converts alternating current voltage that is inputted when regenerative braking is performed in the motor 1107 into direct current voltage.

The motor 1107 generates power that drives the vehicle. Torque generated in the motor 1107 is transferred to drive wheels 1123 by way of the gear 1115 and a drive shaft 1121. A rotor of the motor 1107 is connected directly to the gear 1115. The motor 1107 operates as a generator when regenerative braking is performed. The internal combustion engine 1109 is used to drive the generator 1111.

The generator 1111 is driven by the power of the internal combustion engine 1109 to generate electric power. The electric power generated by the generator 1111 is used to charge the battery 1101 or is supplied to the motor 1107 via the second inverter 1113 and the first inverter 1105. The second inverter 1113 converts alternating current voltage generated by the generator 1111 into direct current voltage. The electric power converted by the second inverter 1113 is used to charge the battery 1101 or is supplied to the motor 1107 via the first inverter 1105.

The gear 1115 is a one-speed fixed gear that corresponds, for example, to a fifth gear. Consequently, the gear 1115 converts a driving force from the motor 1107 into a rotation speed and torque at a specific gear ratio and transfers them to the drive shaft 1121. The vehicle speed sensor 1117 detects a driving speed (a vehicle speed VP) of the vehicle. A signal that signals the vehicle speed VP detected by the vehicle speed sensor 1117 is sent to the management ECU 1119. The rotation speed of the motor 1107 may be used in place of the vehicle speed VP.

The management ECU 1119 obtains information indicating a vehicle speed VP, a residual capacity (SOC: State of Charge) that indicates a state of the battery 1101, an accelerator pedal position (AP position) representing an accelerator pedal depression by the driver of the vehicle, brake pedal effort (BRK effort) representing a brake pedal depression by the driver and a shift range (also, referred to as a "shift position"), and controls individually the motor 1107, the internal combustion engine 1109 and the generator 1111.

The management ECU 1119 controls the motor 1107 so that the motor 1107 executes regenerative braking to obtain a braking force for the vehicle when the vehicle is being decelerated. As this occurs, the management ECU 1119 utilizes regenerated energy that is generated during the regenerative braking executed by the motor 1107 in at least one of a mode in which the regenerated energy is used to charge the battery 1101 and a mode in which the regenerated energy is used to drive the generator 1111 that then rotates the internal combustion engine 1109 as a load.

Figures 2A, 2B, 2C:
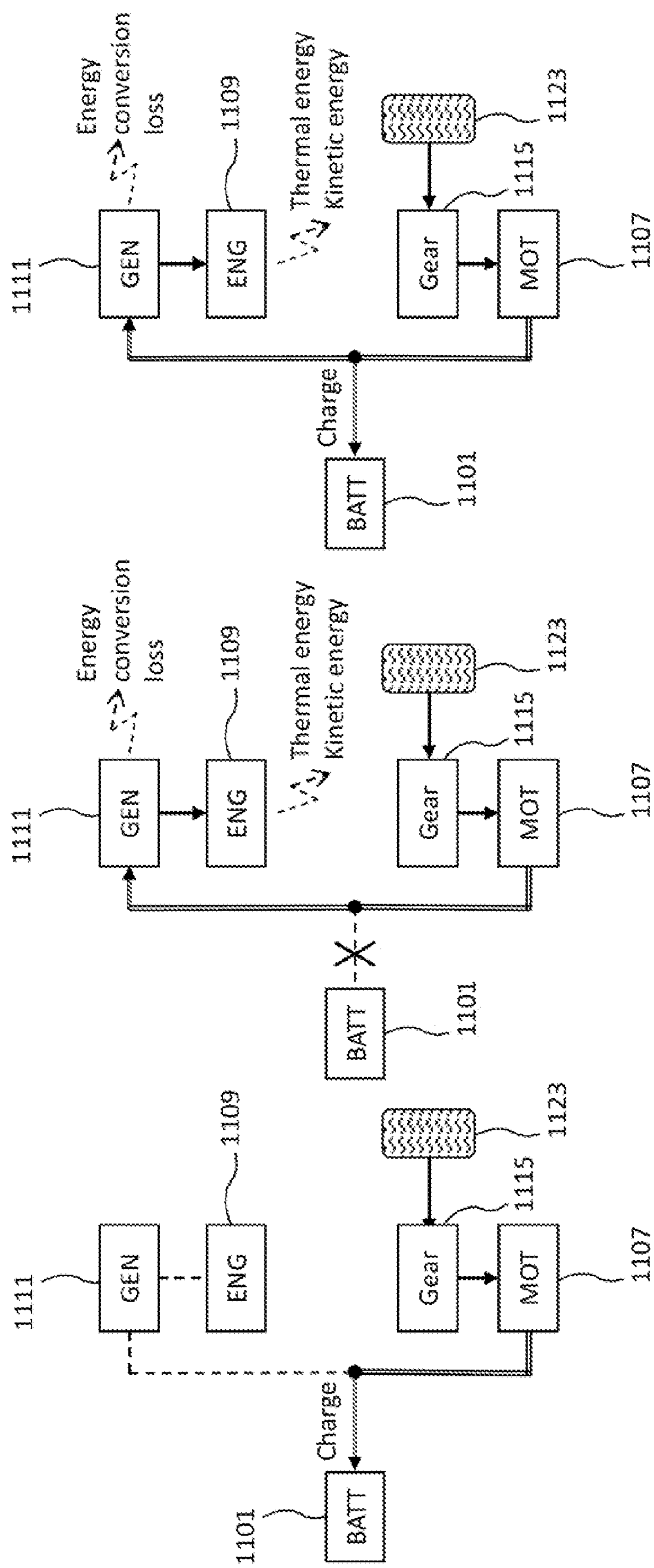
FIGS. 2A to 2C are diagrams showing utilization modes of regenerated energy that is generated by a regenerative control of a motor 107 that is performed when the vehicle is decelerated.

FIGS. 2A to 2C are diagrams showing utilization modes of regenerated energy that is generated by a regenerative control performed on the motor 1107 when the vehicle is decelerated. In particular, FIG. 2A is a diagram showing a mode in which the regenerated energy is used to charge the battery 1101. FIG. 2B is a diagram showing a mode in which the regenerated energy is used to drive the generator 1111 that then rotates the internal combustion engine 1109 as a load. FIG. 2C is a diagram showing a mode in which the regenerated energy is utilized by combining the mode shown in FIG. 2A and the mode shown in FIG. 2B. In FIGS. 2A to 2C, arrows indicated by a solid line indicate flows of torque, and arrows indicated by double lines indicate flows of electric power.

In the mode shown in FIG. 2A (hereinafter, referred to as a "mode A1"), the regenerated energy that is generated by the regenerative control of the motor 1107 charges the battery 1101 or is stored in the battery 1101 as electrical energy. Namely, the regenerated electric power that is generated in the motor 1107 is stored in the battery 1101. In the mode shown in FIG. 2B (hereinafter, referred to as a "mode B1"), the regenerated energy is consumed to drive the generator 1111 that rotates the internal combustion engine 1109 as a load to which the supply of fuel is cut off. As this occurs, an energy conversion loss is generated in the generator 1111, and the internal combustion engine 1109 outputs thermal energy and kinetic energy. In the mode shown in FIG. 2C (hereinafter, referred to as a "mode C1"), part of the regenerated energy charges the battery 1101 to be stored therein, and the remainder is consumed to drive the generator 1111. However, the ratio of utilization of the regenerated energy for storage and consumption differs according to the SOC of the battery 1101.

The management ECU 1119 determines from the modes shown in FIGS. 2A to 2C the mode in which the regenerated energy is used which is generated in the motor 1107 when the vehicle is decelerated according to the driving conditions of the vehicle when it is decelerated and the SOC of the battery 1101. The driving conditions of the vehicle are determined based on the vehicle speed VP and the driving acceleration DA then. The driving acceleration DA is calculated by the management ECU 1119 by time differentiating the vehicle speed VP.

Figure 3:
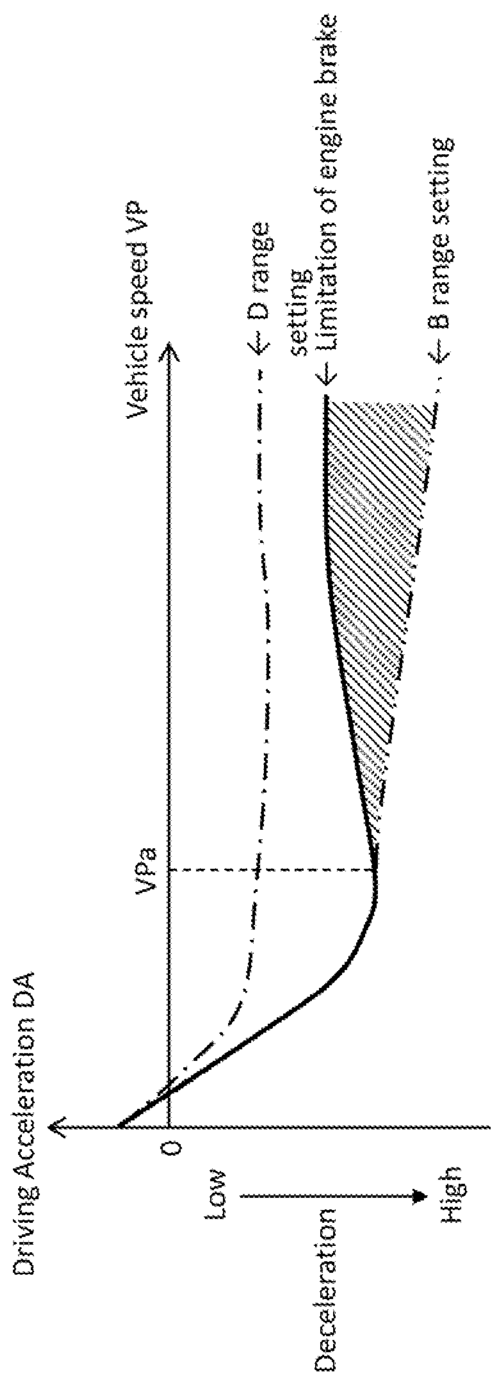
FIG. 3 is a diagram showing a relationship between vehicle speed VP and driving acceleration DA when the vehicle is being decelerated.

FIG. 3 is a diagram showing a relationship between vehicle speed VP and driving acceleration DA when the vehicle is being decelerated. In FIG. 3, three driving accelerations DA (decelerations) that are realized for a vehicle speed VP when the vehicle is decelerated are indicated by a chain line, a two-dot chain line and a thick solid line. The chain line indicates a driving acceleration by a natural deceleration when the shift range of the vehicle is set to a D (drive) range. The two-dot chain line indicates a driving acceleration by a natural deceleration when the shift range of the vehicle is set to a B (brake) range. Irrespective of whether the shift range of the vehicle is set to the D range or the B range, the thick solid line indicates a limit of a deceleration that is obtained when the utilization mode of regenerated energy is a mode B1 shown in FIG. 2B in which regenerated energy that is generated in the motor 1107 when it is controlled so as to execute regenerative braking therein is consumed to drive the generator 1111. A negatively high driving acceleration DA, that is, a high deceleration means that a large braking force is applied to the vehicle.

First Example

Figure 4:
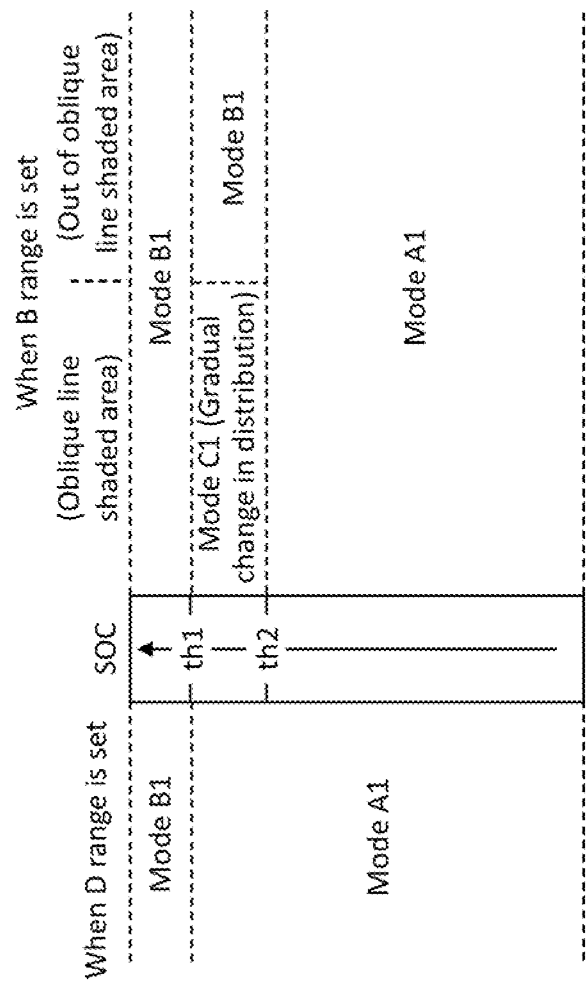
FIG. 4 is a diagram showing an example of a relationship between SOC of a battery 1101 and utilization modes of regenerated energy when a shift range of the vehicle is set to a D range and a B range.

FIG. 4 is a diagram showing an example of a relationship between the SOC of the battery 1101 and utilization modes of regenerated energy when the shift range of the vehicle is set to the D range and the B range. Hereinafter, as a first example, the selection of utilization modes of regenerated energy that is generated in the motor 1107 when the vehicle is decelerated will be described in relation to cases where the shift range of the vehicle is set to the D range and where the shift range is set to the B range by reference to FIGS. 2A to 4.

(Case where the Shift Range is Set to the D Range)

As shown in FIG. 3, the deceleration indicated by the chain line is lower than the deceleration indicated by the thick solid line at any vehicle speed VP. Consequently, when the vehicle is being decelerated with the shift range of the vehicle set to the D range, the management ECU 1119 controls so that the utilization mode of regenerated energy becomes the mode A1 shown in FIG. 2A in the case the SOC of the battery 1101 is smaller than a first threshold th1 shown in FIG. 4. Specifically, the management ECU 1119 does not drive the generator 1111 by making the second inverter 1113 shown in FIG. 1 inactive but activates the converter 1103. On the other hand, in the case the SOC of the battery 1101 is equal to or larger than the first threshold th1, the manage ECU 1119 controls so that the utilization mode of regenerated energy becomes the mode B1 shown in FIG. 2B.

Specifically, the management ECU 1119 drives the generator 1111 by activating the second inverter 1113 but makes the converter 1103 inactive.

(Case where the Shift Range is Set to the B Range)

As shown in FIG. 3, the deceleration indicated by the two-dot chain line is the same as that indicated by the thick solid line at vehicle speeds slower than a predetermined value VPa but is higher at vehicle speed VP equal to or larger than the predetermined value VPa. Consequently, when the vehicle is being decelerated with the shift range of the vehicle set to the B range, the management ECU 1119 controls so that the utilization mode of regenerated energy becomes the mode A1 shown in FIG. 2A in the case the SOC of the battery 1101 is smaller than a second threshold th2. The second threshold th2 is a value that is lower than the first threshold th1. On the other hand, in the case the SOC of the battery 1101 is equal to or larger than the first threshold th1, the manage ECU 1119 controls so that the utilization mode of regenerated energy becomes the mode B1 shown in FIG. 2B.

When the SOC of the battery 1101 is equal to or larger than the second threshold th2 and is smaller than the first threshold th1, in the case the driving condition of the vehicle according to the vehicle speed VP and the driving acceleration DA stays within an area shown as shaded with oblique lines in FIG. 3, the management ECU 1119 controls the utilization mode of regenerated energy becomes the mode C1 shown in FIG. 2C. As this occurs, the management ECU 1119 changes a ratio of a regenerated energy component that is used to charge the battery 1101 to a regenerated energy component that is used to drive the generator 1111 (hereinafter, referred to as a "utilization ratio") according to the SOC of the battery 1101. For example, the management ECU 1119 controls the utilization ratio of regenerated energy so that the regenerated energy component that is used to charge the battery 1101 becomes higher in such a state that the SOC of the battery 1101 exceeds slightly the second threshold th2, whereas the management control ECU 1119 controls the utilization ratio so that the regenerated energy component that is used to drive the generator 1111 becomes gradually higher as the SOC approaches the first threshold th1. On the other hand, although the SOC of the battery 1101 is equal to or larger than the second threshold th2 and is smaller than the first threshold th1, in the case the driving condition of the vehicle stays out of the area shaded with the oblique lines in FIG. 3, the management ECU 1119 controls so that the utilization mode of regenerated energy becomes the mode B1 shown in FIG. 2B.

Figure 5:
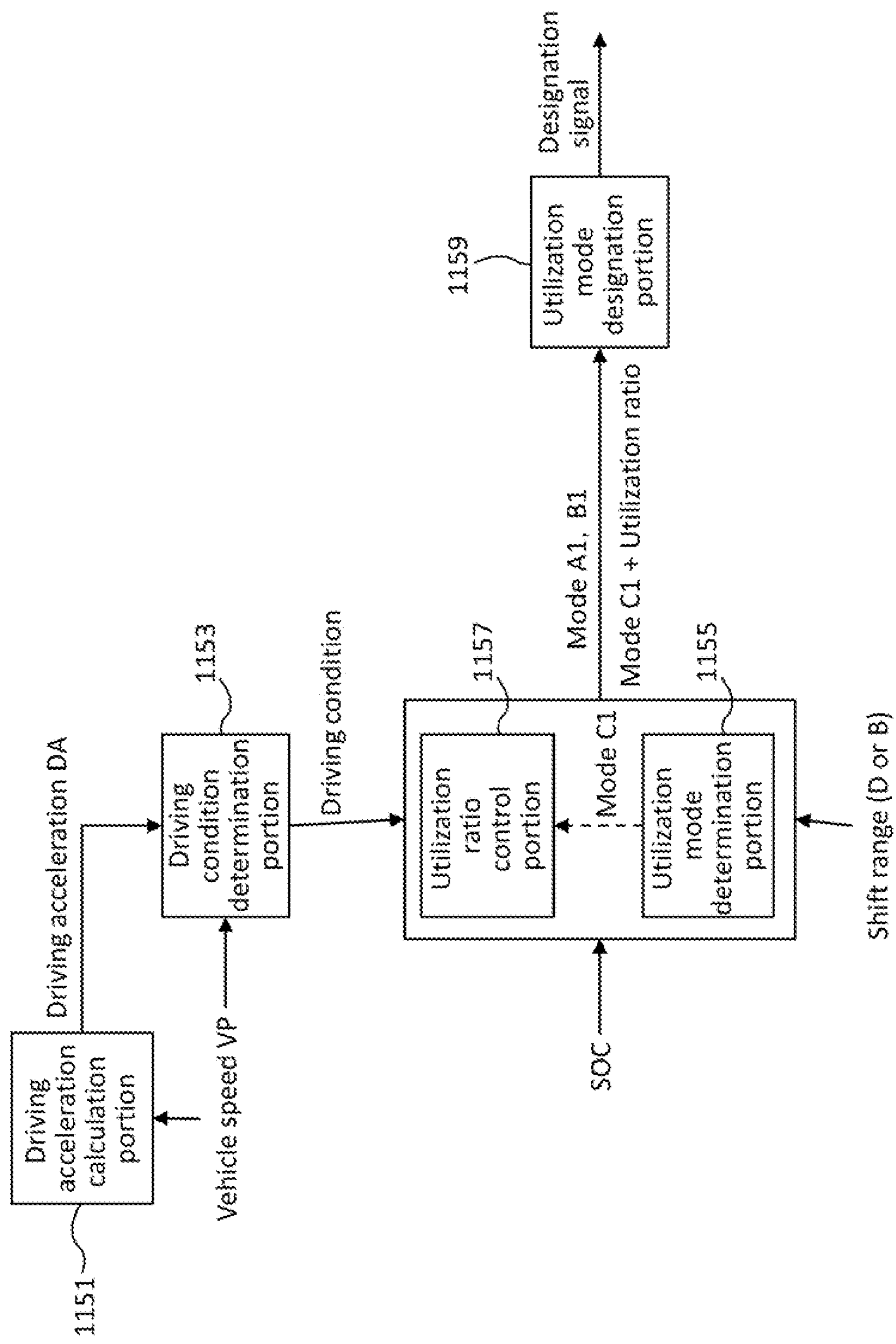
FIG. 5 is a block diagram showing an internal configuration of a management ECU 1119.

FIG. 5 is a block diagram showing an internal configuration of the management ECU 1119. As shown in FIG. 5, the management ECU 1119 has a driving acceleration calculation portion 1151, a driving condition determination portion 1153, a utilization mode determination portion 1155, a utilization ratio control portion 1157 and a utilization mode designating portion 1159.

The driving acceleration calculation portion 1151 calculates a driving acceleration DA by time differentiating the vehicle speed VP. The driving condition determination portion 1153 determines a driving condition of the vehicle based on the vehicle speed VP and the driving acceleration DA. The utilization mode determination portion 1155 determines the utilization mode where the regenerated energy generated in the motor 1107 when the vehicle is decelerated is used from the modes A1 to C1 shown in FIGS. 2A to 2C based on the shift range (the D range or the B range) that is set by the driver, the SOC of the battery 1101 and whether or not the driving condition of the vehicle stays in the area shaded with the oblique lines shown in FIG. 3. The utilization ratio control portion 1157 controls the utilization ratio according to the SOC of the battery 1101 when the utilization mode determination portion 1155 determines that the utilization mode of regenerated energy is the mode C1. The utilization mode designation portion 1159 outputs a designation signal that makes it possible that the utilization mode of regenerated energy in the vehicle becomes the mode that is determined by the utilization mode determination portion 1155. A designation signal that corresponds to the mode C1 contains a designated utilization ratio.

Figure 6:
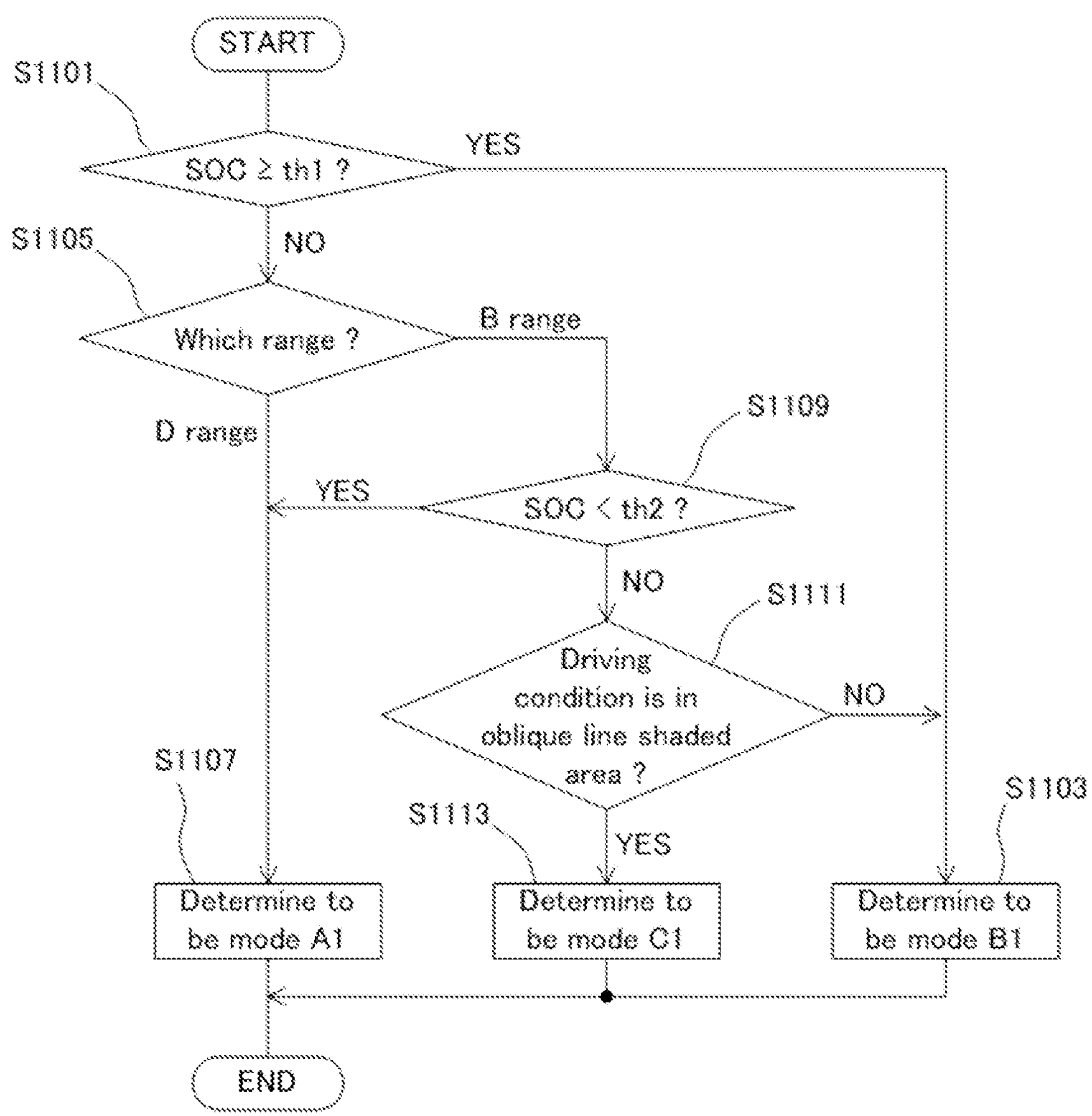
FIG. 6 is a flowchart of a first example showing an operation of a utilization mode determination portion 1155 that the management ECU 1119 has.

FIG. 6 is a flowchart showing an operation of the utilization mode determination portion 1155 that the management ECU 1119 has. As shown in FIG. 6, the utilization mode determination portion 1155 determines whether or not the SOC of the battery 1101 is equal to or larger than the first threshold th1 (SOC≥th1) (step S1101). Then, if it determines that SOC≥th1, it proceeds to step S1103, whereas if it determines that SOC<th1, it proceeds to step S1105. At step S1103, the utilization mode determination portion 1155 determines the utilization mode of the regenerated energy to be the mode B1. On the other hand, at step S1105, the utilization mode determination portion 1155 determines whether the shift range is the D range or the B range. If it determines that the shift range is the D range, it proceeds to step S1107, whereas if it determines that the shift range is the B range, it proceeds to step S1109.

At step S1107, the utilization mode determination portion 1155 determines the utilization mode of the regenerated energy to be the mode A1. On the other hand, at step S1109, the utilization mode determination portion 1155 determines whether or not the SOC of the battery 1101 is smaller than the second threshold th2 (SOC<th2). If it determines that SOC<th2, it proceeds to step S1107, whereas if it determines that SOC≥th2, it proceeds to step S1111. At step S1111, the utilization mode determination portion 1155 determines whether or not the driving condition of the vehicle stays within the area shown as shaded with the oblique lines in FIG. 3. If it determines that the driving condition of the vehicle stays within the area shaded with the oblique lines, it proceeds to step S1113, whereas if it determines that the driving condition stays out of the area shaded with the oblique lines, it proceeds to step S1103. At step S1113, the utilization mode determination portion 1155 determines the utilization mode of the regenerated energy to be the mode C1.

Second Example

Figure 7:
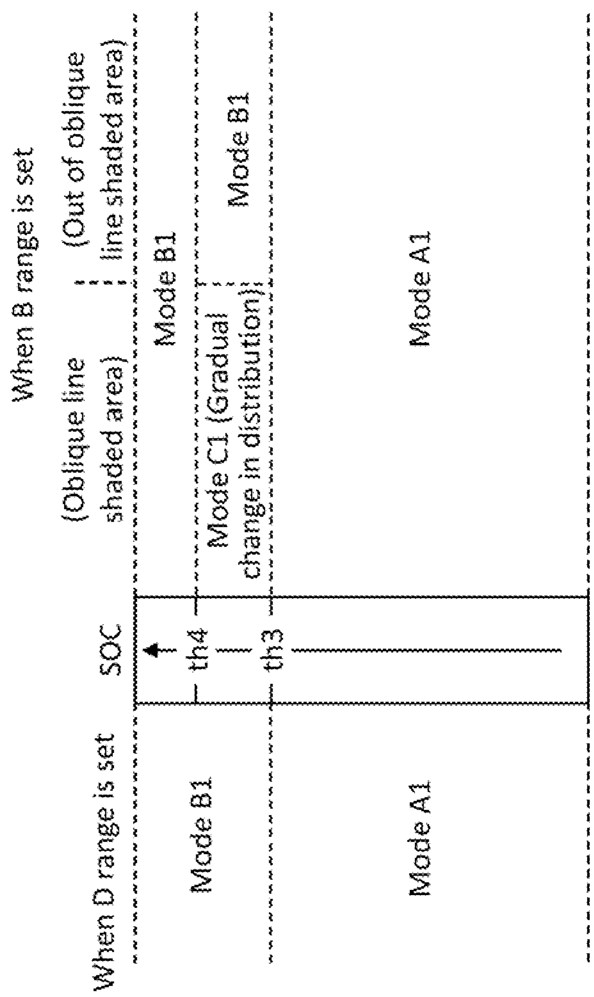
FIG. 7 is a diagram showing another example of a relationship between SOC of the battery 1101 and the utilization modes of regenerated energy when the shift range of the vehicle is set to the D range and the B range.

FIG. 7 is a diagram showing another example of a relationship between the SOC of the battery 1101 and utilization modes of regenerated energy when the shift range of the vehicle is set to the D range and the B range. Hereinafter, as a second example, the selection of utilization modes of regenerated energy that is generated in the motor 1107 when the vehicle is decelerated will be described in relation to cases where the shift range of the vehicle is set to the D range and where the shift range is set to the B range by reference to FIGS. 2A to 2C, 3 and 7.

(Case where the Shift Range is Set to the D Range)

As shown in FIG. 3, the deceleration indicated by the chain line is lower than the deceleration indicated by the thick solid line at any vehicle speed VP. Consequently, when the vehicle is being decelerated with the shift range of the vehicle set to the D range, the management ECU 1119 controls so that the utilization mode of regenerated energy becomes the mode A1 shown in FIG. 2A in the case the SOC of the battery 1101 is smaller than a third threshold th3 shown in FIG. 7. Specifically, the management ECU 1119 does not drive the generator 111 by making the second inverter 1113 shown in FIG. 1 inactive but activates the converter 1103. On the other hand, in the case the SOC of the battery 1101 is equal to or larger than the third threshold th3, the manage ECU 1119 controls so that the utilization mode of regenerated energy becomes the mode B1 shown in FIG. 2B. Specifically, the management ECU 1119 drives the generator 1111 by activating the second inverter 1113 but makes the converter 1103 inactive.

(Case where the Shift Range is Set to the B Range)

As shown in FIG. 3, the deceleration indicated by the two-dot chain line is the same as that indicated by the thick solid line at vehicle speeds slower than a predetermined value VPa but is higher at vehicle speed VP equal to or larger than the predetermined value VPa. Consequently, when the vehicle is being decelerated with the shift range of the vehicle set to the B range, the management ECU 1119 controls so that the utilization mode of regenerated energy becomes the mode A1 shown in FIG. 2A in the case the SOC of the battery 1101 is smaller than the third threshold th3. On the other hand, if the SOC of the battery 1101 is equal to or larger than a fourth threshold th4, the management ECU 1119 controls so that the utilization mode of regenerated energy becomes the mode B1 shown in FIG. 2B. The fourth threshold th4 is a value that is higher than the third threshold th3.

When the SOC of the battery 1101 is equal to or larger than the third threshold th3 and is smaller than the fourth threshold th4, in the case the driving condition of the vehicle according to the vehicle speed VP and the driving acceleration DA stays within the area shown as shaded with the oblique lines in FIG. 3, the management ECU 1119 controls the utilization mode of regenerated energy becomes the mode C1 shown in FIG. 2C. As this occurs, the management ECU 1119 changes a ratio of a regenerated energy component that is used to charge the battery 1101 to a regenerated energy component that is used to drive the generator 1111 (hereinafter, referred to as a "utilization ratio") according to the SOC of the battery 1101. For example, although the utilization ratio of regenerated energy is such that the regenerated energy component that is used to charge the battery 1101 is higher in such a state that the SOC of the battery 1101 exceeds slightly the third threshold th3, the management control ECU 1119 controls the utilization ratio so that the regenerated energy component that is used to drive the generator 1111 becomes gradually higher as the SOC approaches the fourth threshold th4. On the other hand, although the SOC of the battery 1101 is equal to or larger than the third threshold th3 and is smaller than the fourth threshold th4, in the case the driving condition of the vehicle stays out of the area shown as shaded with the oblique lines in FIG. 3, the management ECU 1119 controls so that the utilization mode of regenerated energy becomes the mode B1 shown in FIG. 2B.

The configuration of the management ECU 1119 of the second example is similar to that of the first example.

Figure 8:
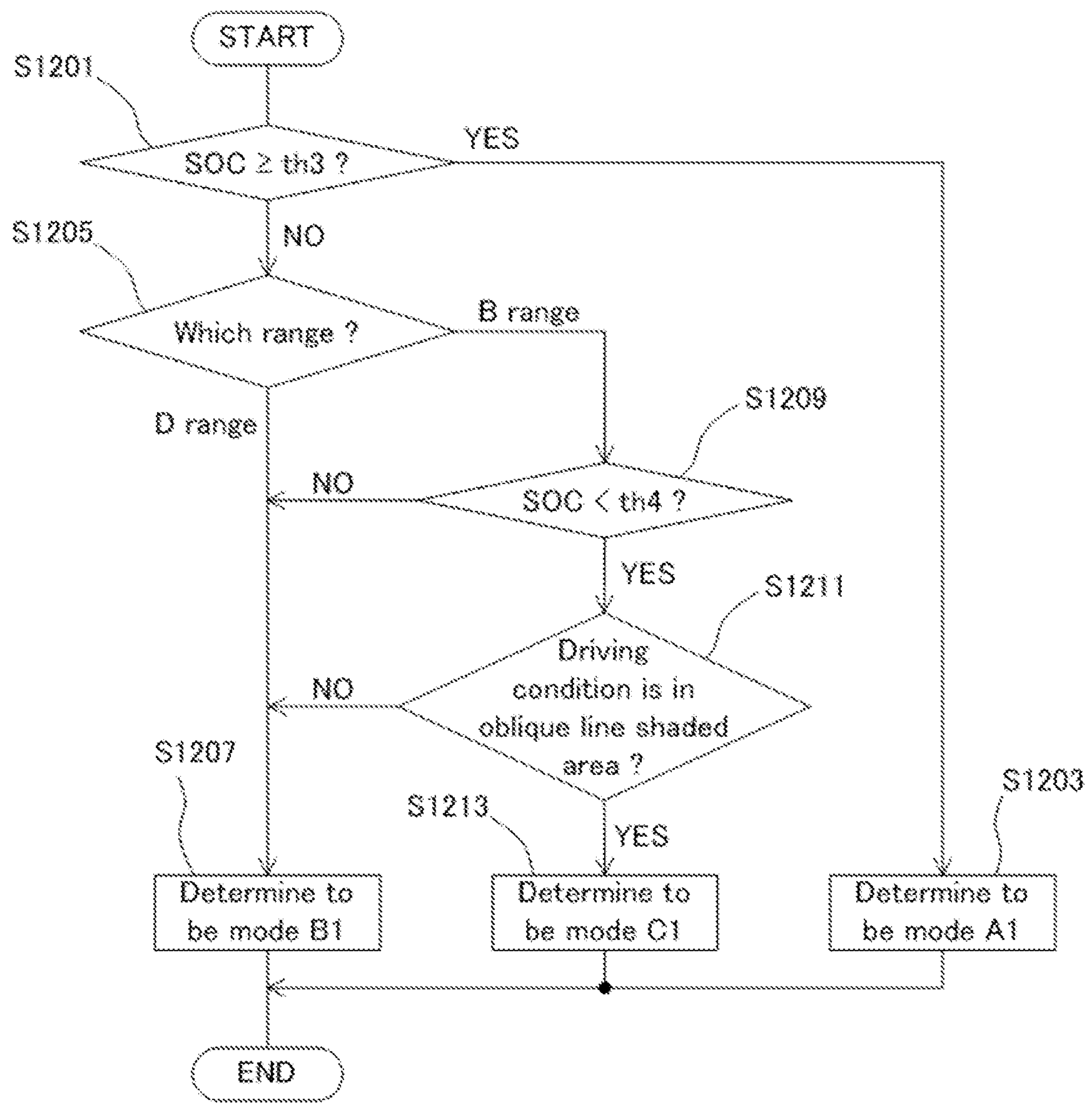
FIG. 8 is a flowchart of a second example showing an operation of the utilization mode determination portion 1155 that the management ECU 1119 has.

FIG. 8 is a flowchart showing an operation of a utilization mode determination portion 1155 that the management ECU 1119 has. As shown in FIG. 8, the utilization mode determination portion 1155 determines whether or not the SOC of the battery 1101 is smaller than the third threshold th3 (SOC<th3) (step S1201). Then, if it determines that SOC<th3, it proceeds to step S1203, whereas if it determines that SOC≥th3, it proceeds to step S1205. At step S1203, the utilization mode determination portion 1155 determines the utilization mode of the regenerated energy to be the mode A1. On the other hand, at step S1205, the utilization mode determination portion 1155 determines whether the shift range is the D range or the B range. If it determines that the shift range is the D range, it proceeds to step S1207, whereas if it determines that the shift range is the B range, it proceeds to step S1209.

At step S1207, the utilization mode determination portion 1155 determines the utilization mode of the regenerated energy to be the mode B1. On the other hand, at step S1209, the utilization mode determination portion 1155 determines whether or not the SOC of the battery 1101 is smaller than the fourth threshold th4 (SOC<th4). If it determines that SOC<th4, it proceeds to step S1211, whereas if it determines that SOC≥th4, it proceeds to step S1207. At step S1211, the utilization mode determination portion 1155 determines whether or not the driving condition of the vehicle stays within the area shown as shaded with the oblique lines in FIG. 3. If it determines that the driving condition of the vehicle stays within the area shaded with the oblique lines, it proceeds to step S1213, whereas if it determines that the driving condition stays out of the area shaded with the oblique lines, it proceeds to step S1207 At step S1213, the utilization mode determination portion 1155 determines the utilization mode of the regenerated energy to be the mode C1.

Thus, as has been described heretofore, in this embodiment, whether the first example or the second example is adopted, when the deceleration resulting from the natural deceleration when the shift range is set to the B range exceeds the deceleration that corresponds to the absorption of regenerated energy by driving the generator 1111 that rotates the internal combustion engine 1109 as a load, the utilization mode of the regenerated energy is determined to be the mode C1, and then, the utilization ratio of regenerated energy is changed according to the SOC of the battery 1101. As a result, the degree of absorption of the regenerated energy is changed gradually, and therefore, the vehicle is decelerated without making the driver have inharmonious feeling.

Second Embodiment

Figure 9A:
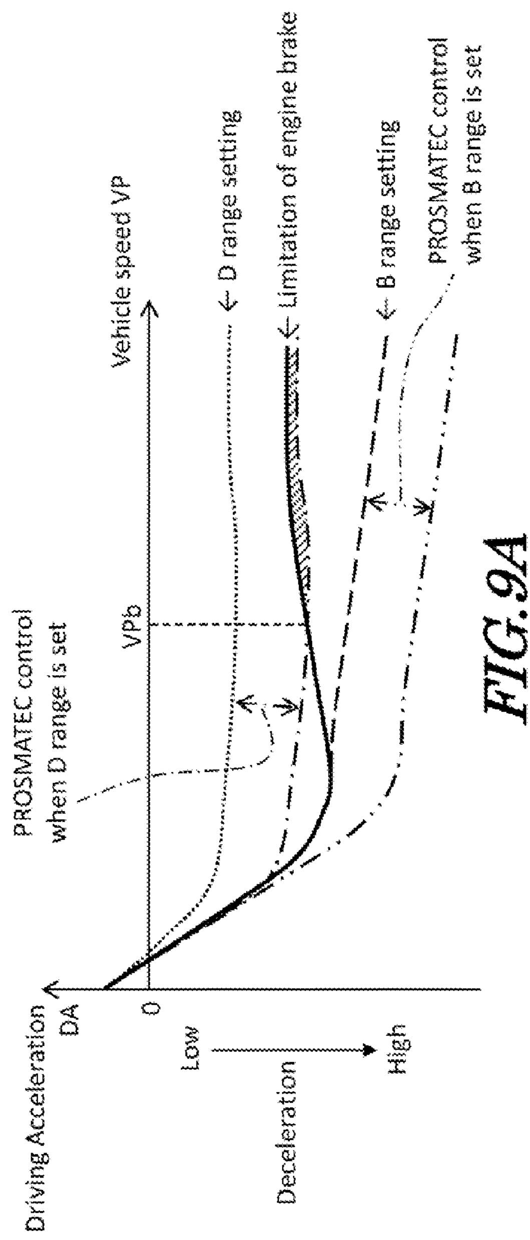
FIG. 9A is a diagram showing a relationship between vehicle speed VP and driving acceleration DA when a PROSMATEC control is performed when the vehicle shown in FIG. 1 is decelerated.

In a vehicle in which a PROSMATEC (registered trademark) control is performed to restrict frequent occurrence of gear shifts when the vehicle is climbing up or down a slope, a deceleration that is larger than a driving acceleration based on a natural deceleration is realized according to a gradient of the slope. FIG. 9A is a diagram showing a relationship between a vehicle speed VP and a driving acceleration DA when the PROSMATEC control is performed on the vehicle shown in FIG. 1 while the vehicle is being decelerated.

A thin dotted line shown in FIG. 9A indicates a driving acceleration based on a natural deceleration when the shift range of the vehicle is set to a D (drive) range. A chain line indicates a driving acceleration when the PROSMATEC control is performed on the vehicle whose shift range is set to the D range. A thick dotted line indicates a driving acceleration based on a natural deceleration when the shift range of the vehicle is set to a B (brake) range. A two-dot chain line indicates a driving acceleration when the PROSMATEC control is performed on the vehicle whose shift range is set to the B range. Irrespective of whether the shift range of the vehicle is set to the D range or the B range, the thick solid line indicates a limit of a deceleration that is obtained when the utilization mode of regenerated energy is a mode B1 shown in FIG. 2B in which regenerated energy that is generated in the motor 1107 when it is controlled so as to execute regenerative braking therein is consumed to drive the generator 1111. In FIG. 9A, a deceleration realized by performing the PROSMATEC control on the vehicle that is descending the falling slope while being decelerated is shown as being replaced by a deceleration realized when the vehicle is driven on a flat road while being decelerated.

Figure 9B:
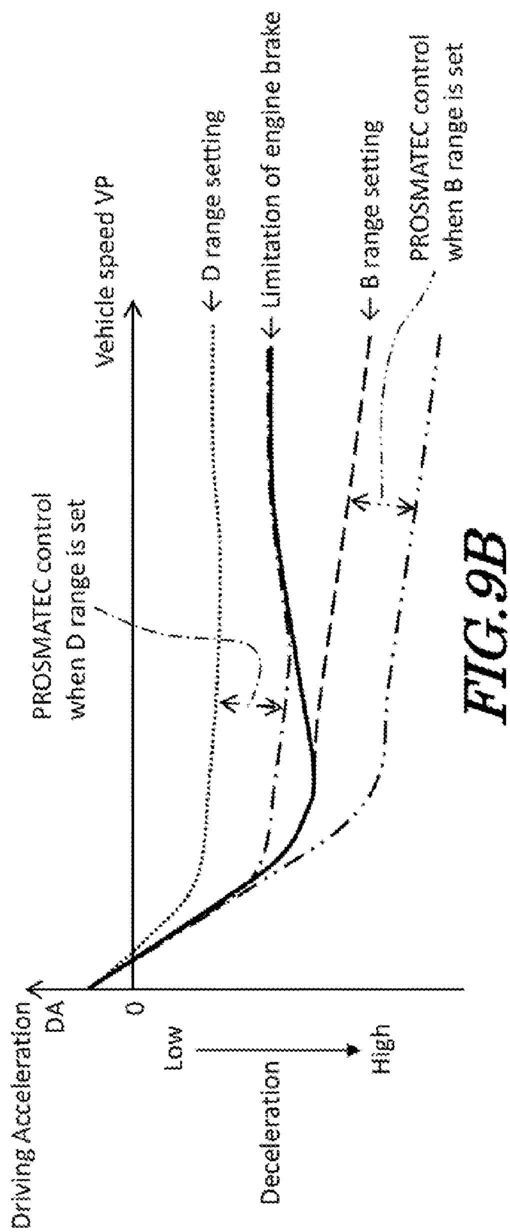
FIG. 9B is a relationship between vehicle speed VP and driving acceleration DA when the PROSMATEC control is performed when a vehicle of a second embodiment is decelerated.

Also, in the vehicle of this embodiment, similar to the first embodiment, in the case a SOC of a battery 1101 is equal to or larger than a threshold th1 when the vehicle whose shift range is set to the D range is decelerated, a utilization mode of regenerated energy is controlled so as to be the mode B1 shown in FIG. 2B. However, as shown in FIG. 9A, the driving acceleration indicated by the chain line that results when the PROSMATEC control is performed on the vehicle whose shift range is set to the D range is smaller than that indicated by the thick solid line when the vehicle speed VP is slower than a predetermined value VPb, whereas when the vehicle speed VP is equal to or faster than the predetermined value VPb, the driving acceleration becomes higher than that indicated by the thick solid line. Consequently, in this embodiment, in the case the SOC of the battery 1101 is equal to or larger than the threshold th1 with the shift range of the vehicle set to the D range, the PROSMATEC control is performed so that the driving condition of the vehicle that corresponds to the vehicle speed VP and the driving acceleration DA stays out of an area shown as shaded with oblique lines in FIG. 9A. Namely, when the D range is set as the shift range of the vehicle, in the case the SOC of the battery 1101 is equal to or larger than the threshold th1, the driving acceleration DA of the vehicle on which the PROSMATEC control is being performed is restricted to or lower than the limit of the deceleration in the mode B1 that is indicated by the thick solid line in FIG. 9A. FIG. 9B is a diagram showing a relationship between a vehicle speed VP and a driving acceleration DA when the PROSMATEC control is performed on the vehicle of the second embodiment while the vehicle is being decelerated.

Thus, as has been described heretofore, in this embodiment, the deceleration based on the natural deceleration resulting from the PROSMATEC control that is performed on the vehicle whose shift range is set to the D range is set so as not to exceed the deceleration that corresponds to the absorption of regenerated energy by driving the generator 1111 that rotates the internal combustion engine 1109 as a load. Because of this, the PROSMATEC control is performed within a range of deceleration where the PROSMATEC control can be realized when the vehicle whose shift range is set to the D range is decelerated. In this embodiment, too, the selection of the utilization modes of regenerated energy when the shift range of the vehicle is set to the B range is similar to that of the first embodiment, including the PROSMATEC control.

Figure 10:
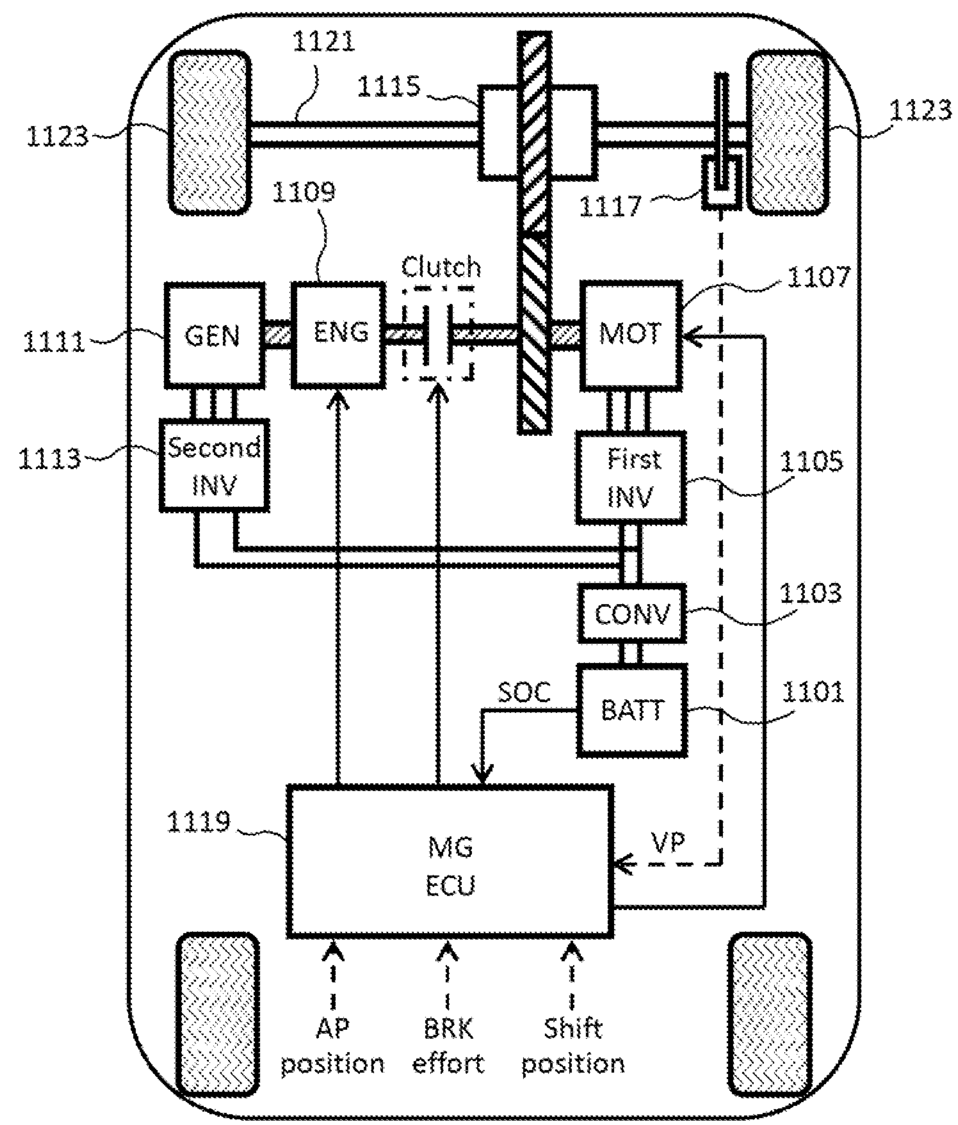
FIG. 10 is a block diagram showing an internal configuration of a series/parallel system HEV.

In the first embodiment and the second embodiment, while the invention is described as being applied to the series system HEV, the invention can also be applied to the series/parallel system HEV shown in FIG. 10.

Hereinafter, embodiments of the invention will be described by reference to the drawings.

Third Embodiment

Figure 11:
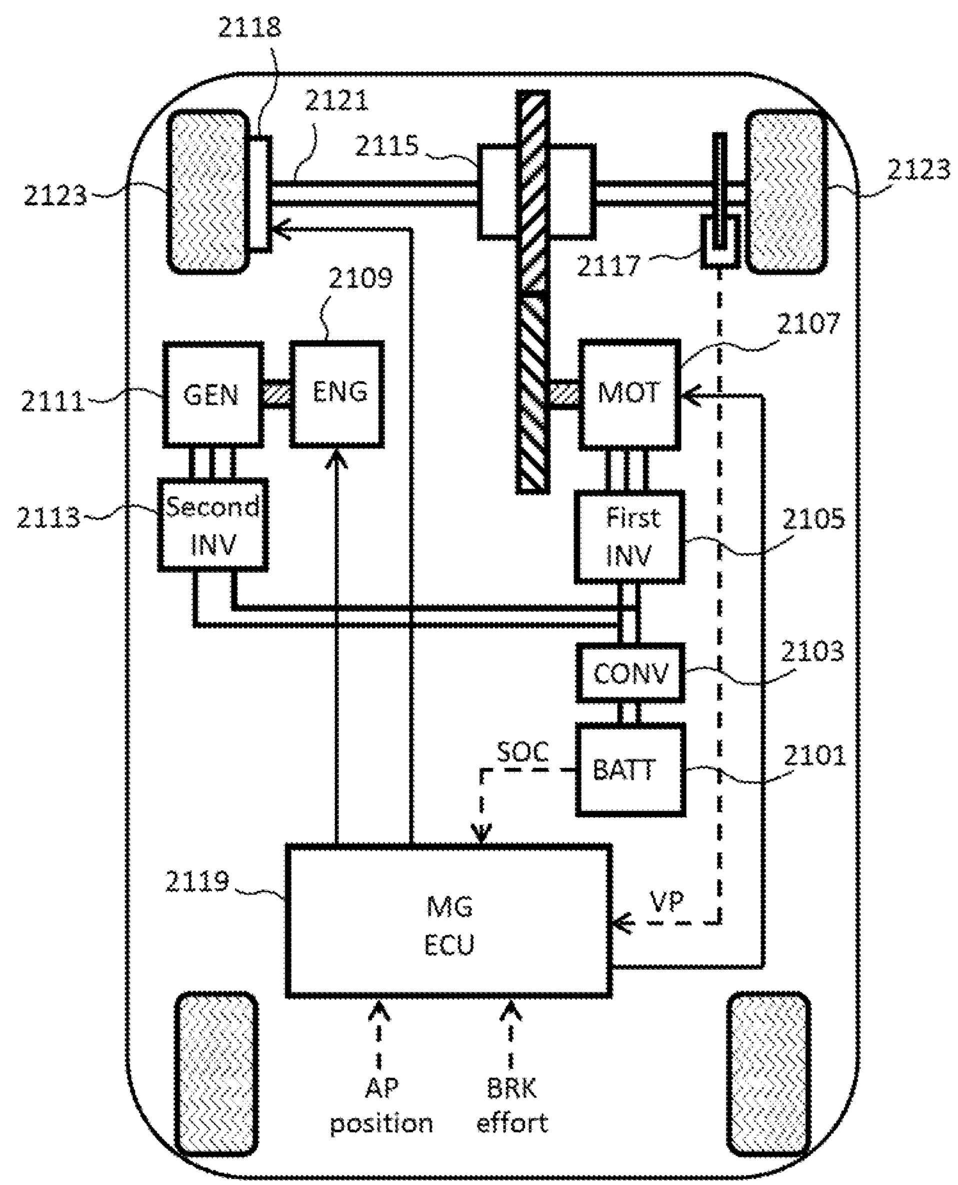
FIG. 11 is a block diagram showing an internal configuration of a series system HEV.

FIG. 11 is a block diagram showing an internal configuration of a series system HEV. As shown in FIG. 11, a series system HEV (hereinafter, referred to simply as a “vehicle”) includes a battery (BATT) 2101, a converter (CONV) 2103, a first inverter (first INV) 2105, a motor (Mot) 2107, an internal combustion engine (ENG) 2109, a generator (GEN) 2111, a second inverter (second INV) 2113, a gearbox (hereinafter, referred to simply as a “gear”) 2115, a vehicle speed sensor 2117, a mechanical brake 2118 and a management ECU (MG ECU) 2119. In FIG. 11, arrows indicated by a dotted line indicates flows of value data, and arrows indicated by a solid line indicates flows of control signal that signal instructions.

The battery 2101 has a plurality of battery cells that are connected in series and supplies a high voltage in the range of, for example, 100 to 200V. The battery cells are, for example, lithium ion battery cells or nickel-metal hydride battery cells. The converter 2103 increases or decreases a direct current output voltage of the battery 2101 as the direct current is. The first inverter 2105 converts direct current voltage into alternating current voltage to supply a three-phase current to the motor 2107. The first inverter 2105 also converts alternating current voltage that is inputted when regenerative braking is performed in the motor 2107 into direct current voltage.

The motor 2107 generates power that drives the vehicle. Torque generated in the motor 2107 is transferred to drive wheels 2123 by way of the gear 2115 and a drive shaft 2121. A rotor of the motor 2107 is connected directly to the gear 2115. The motor 2107 operates as a generator when regenerative braking is performed. The internal combustion engine 2109 is used to drive the generator 2111.

The generator 2111 is driven by the power of the internal combustion engine 2109 to generate electric power. The electric power generated by the generator 2111 is used to charge the battery 2101 or is supplied to the motor 2107 via the second inverter 2113 and the first inverter 2105. The second inverter 2113 converts alternating current voltage generated by the generator 2111 into direct current voltage. The electric power converted by the second inverter 2113 is used to charge the battery 2101 or is supplied to the motor 2107 via the first inverter 2105.

The gear 2115 is a one-speed fixed gear that corresponds, for example, to a fifth gear. Consequently, the gear 2115 converts a driving force from the motor 2107 into a rotation speed and torque at a specific gear ratio and transfers them to the drive shaft 2121. The vehicle speed sensor 2117 detects a driving speed (a vehicle speed VP) of the vehicle. A signal that signals the vehicle speed VP detected by the vehicle speed sensor 2117 is sent to the management ECU 2119. The rotation speed of the motor 2107 may be used in place of the vehicle speed VP.

The mechanical brake 2118 generates a braking force of the vehicle by retarding the rotation of the drive wheel 2123 with a frictional force.

The management ECU 2119 obtains information indicating a vehicle speed VP, a residual capacity (SOC: State of Charge) that indicates a state of the battery 2101, an accelerator pedal position (AP position) representing an accelerator pedal depression by the driver of the vehicle, and brake pedal effort (BRK effort) representing a brake pedal depression by the driver, and controls individually the motor 2107, the internal combustion engine 2109, the generator 2111 and the mechanical brake 2118. For example, the vehicle obtains a braking force by controlling the mechanical brake 2118 by the management ECU 2119.

The management ECU 2119 controls the motor 2107 so that the motor 2107 executes regenerative braking to obtain a braking force of the vehicle when the vehicle is being decelerated. As this occurs, the management ECU 2119 utilizes regenerated energy that is generated during the regenerative braking executed by the motor 2107 in at least one of a mode in which the regenerated energy is used to charge the battery 2101 and a mode in which the regenerated energy is used to drive the generator 2111 that then rotates the internal combustion engine 2109 as a load.

Figures 12A, 12B:
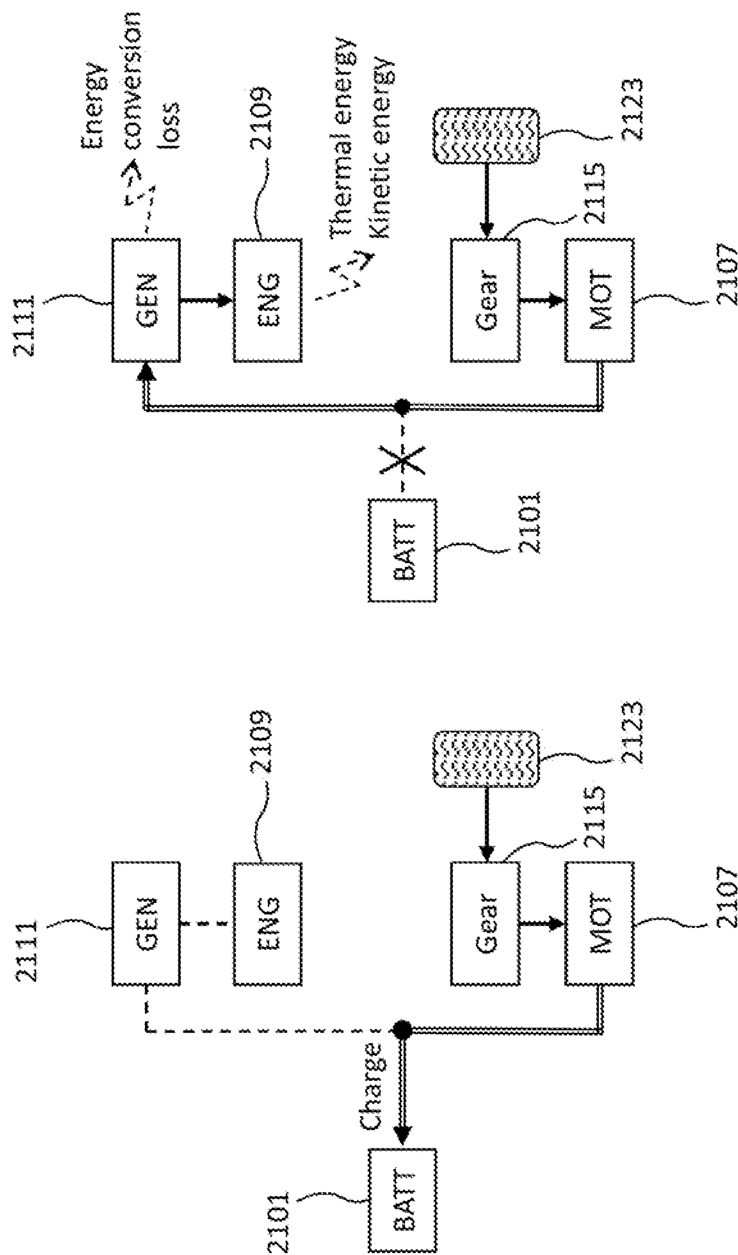
FIGS. 12A and 12B are diagrams showing utilization modes of regenerated energy that is generated by a regenerative control of a motor 2107 that is performed when a vehicle of a third embodiment is decelerated.

FIGS. 12A and 12B are diagrams showing utilization modes of regenerated energy that is generated by a regenerative control of the motor 2107 that is performed when a vehicle of the third embodiment is decelerated. In particular, FIG. 12A is a diagram showing a mode in which the regenerated energy is used to charge the battery 2101. FIG. 12B is a diagram showing a mode in which the regenerated energy is used to drive the generator 2111 that then rotates the internal combustion engine 2109 as a load. In FIGS. 12A and 12B, arrows indicated by a solid line indicate flows of torque, and arrows indicated by double lines indicate flows of electric power.

In the mode shown in FIG. 12A (hereinafter, referred to as a "mode A2"), the management ECU 2119 does not drive the generator 2111 by making the second inverter 2113 as shown in FIG. 11 inactive but activates the converter 2103. As a result, the regenerated energy that is generated by the regenerative control of the motor 2107 charges the battery 2101 or is stored in the battery 2101 as electrical energy. Namely, the regenerated electric power that is generated in the motor 2107 is stored in the battery 2101.

In the mode shown in FIG. 12B (hereinafter, referred to as a "mode B2"), the management ECU 2119 activates the second inverter 2113 to drive the generator 2111 but does not activate the converter 2103. As a result, the regenerated energy that is generated by the regenerative control of the motor 2107 is consumed to drive the generator 2111 that rotates the internal combustion engine 2109 as a load to which the supply of fuel is cut off. As this occurs, an energy conversion loss is generated in the generator 2111, and the internal combustion engine 2109 outputs thermal energy and kinetic energy.

In the third embodiment, the management ECU 2119 determines whether or not the regenerated energy that is generated in the motor 2107 is used in the mode A2 shown in FIG. 12A or the mode B2 shown in FIG. 12B and also determines whether or not braking utilizing the mechanical brake 2118 is also used according to the SOC of the battery 2101 when the vehicle is decelerated.

Figure 13:
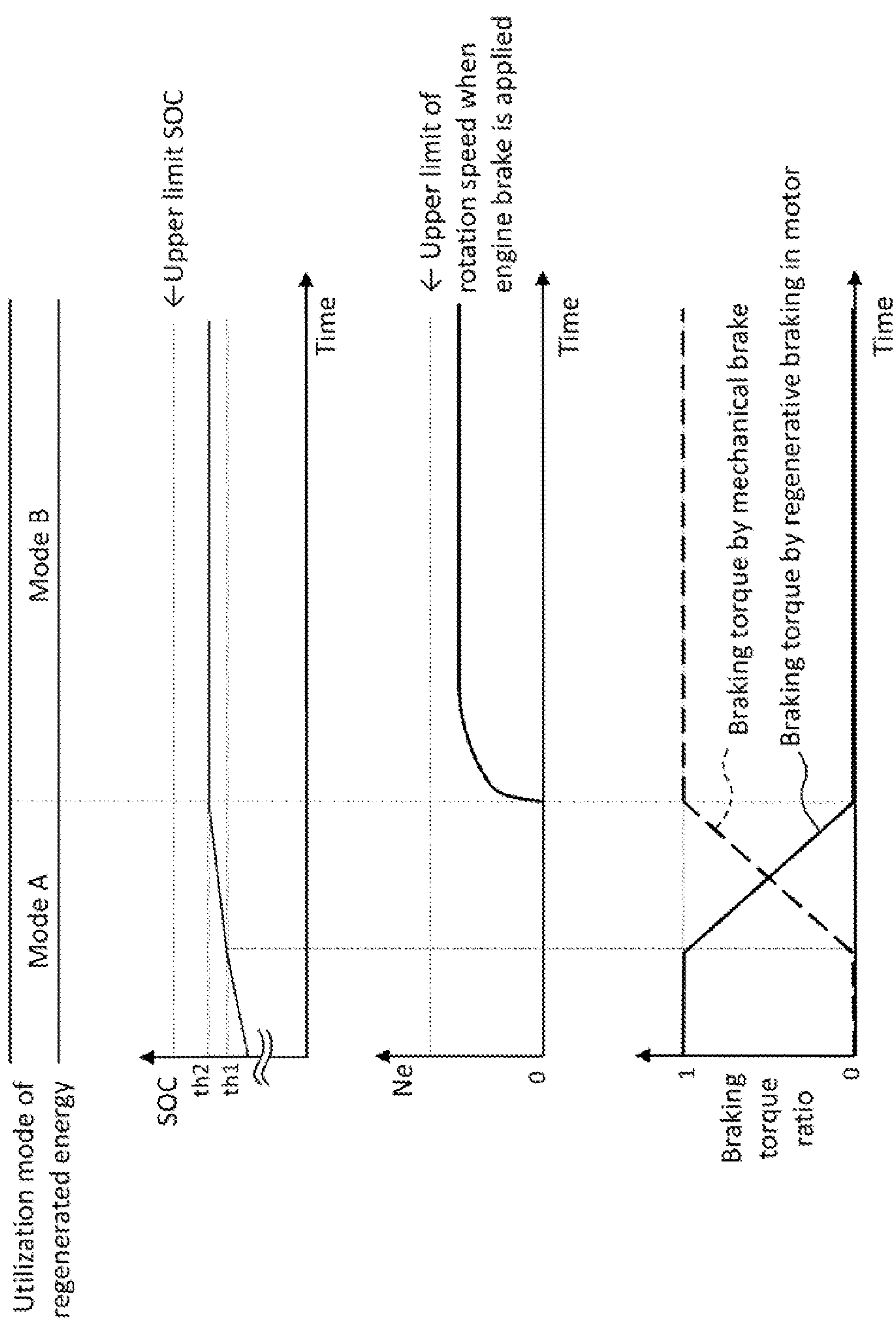
FIG. 13 is a graph showing an example of change with time of utilization modes of regenerated energy, SOC of a battery 2101, rotation speed Ne of an internal combustion engine 2109 and braking torque ratio when the vehicle of the third embodiment is decelerated constantly.

FIG. 13 is a graph showing an example of change with time of utilization modes of regenerated energy, SOC of the battery 2101, rotation speed Ne of the internal combustion engine 2109 and braking torque ratio when the vehicle of the third embodiment is decelerated constantly. Hereinafter, referring to FIG. 13, the control of the utilization modes of regenerated energy and the mechanical brake 2118 by the management ECU 2119 of the third embodiment will be described.

As shown in FIG. 13, in the case the SOC of the battery 2101 is smaller than a first threshold th1, the management ECU 2119 controls so that the utilization mode of regenerated energy becomes the mode A2 shown in FIG. 12A when the vehicle is decelerated, and the vehicle is decelerated by braking torque generated in the mode A2. In the mode A2, the SOC is increased because the battery 2101 is charged. In the case the SOC of the battery 2101 becomes equal to or larger than the first threshold th1, the management ECU 2119 starts controlling the mechanical brake 2118 while keeping the utilization mode of regenerated energy in the mode A2. The first threshold th1 is an SOC value of the battery 2101 that enables the vehicle to cover a predetermined traveling distance.

After having started controlling the mechanical brake 2118, the management ECU 2119 changes a ratio of braking torque generated in the mode A2 to braking torque generated by the mechanical brake 2118 (hereinafter, referred to as a "braking torque ratio") according to the SOC of the battery 2101. As a result, a ratio of the braking torque generated by the mechanical brake 2118 to a whole of braking torque required increases gradually, and the amount of regenerated energy generated in the motor 2107 decreases. When the SOC of the battery 2101 reaches a second threshold th2, the management ECU 2119 controls the mechanical brake 2118 so that the braking torque generated by the mechanical brake 2118 can manage to cover the whole of the braking torque required. When the braking torque generated by the mechanical brake 2118 manages to cover the whole of the braking torque required, no regenerated energy is generated in the motor 2107. However, in the event that the vehicle is decelerated naturally, regenerated energy is generated. As this occurs, the regenerated energy is consumed to drive the generator 2111 that rotates the internal combustion engine 2109 as a load.

When the SOC of the battery 2101 reaches the second threshold th2, enabling the whole of the braking torque required to be covered by the mechanical brake 2118, the management ECU 2119 controls so that the utilization mode of regenerated energy becomes the mode B2 shown in FIG. 12B. As has been described above, the regenerated energy in the mode B2 is consumed to drive the generator 2111, and therefore, the battery 2101 is not charged. Consequently, after the utilization mode of regenerated energy is controlled to become the mode B2 by the management ECU 2119, the SOC of the battery 2101 is not increased.

Figure 14:
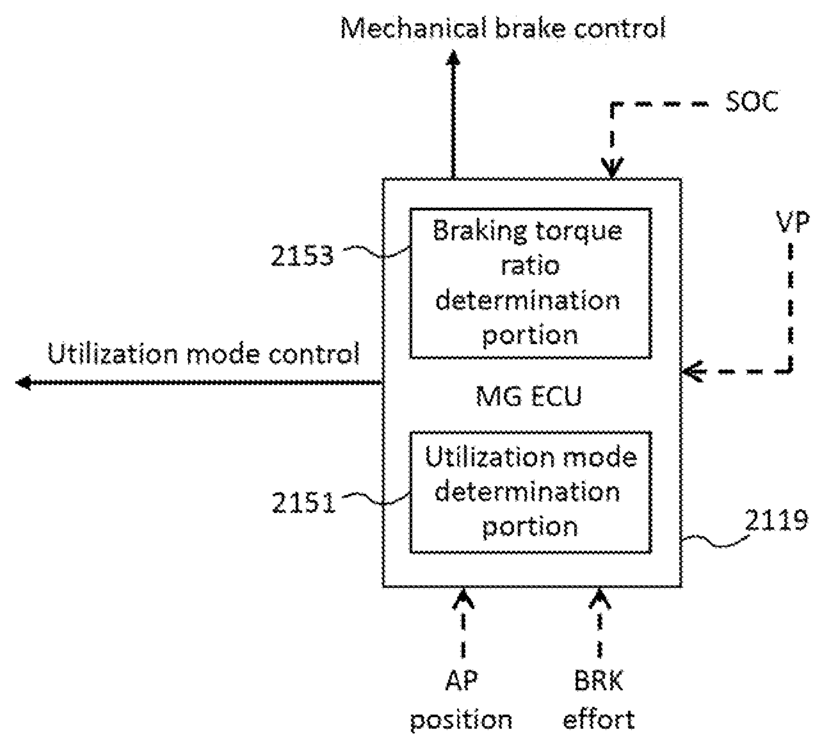
FIG. 14 is a block diagram showing an internal configuration of a management ECU 2119.

FIG. 14 is a block diagram showing an internal configuration of the management ECU 2119. As shown in FIG. 14, the management ECU 2119 has a utilization mode determination portion 2151 and a braking torque ratio determination portion 2153.

The utilization mode determination portion 2151 determines whether the regenerated energy that is generated in the motor 2107 when the vehicle is decelerated is used in the mode A2 shown in FIG. 12A or the mode B2 shown in FIG. 12B based on AP position, BRK effort and the SOC of the vehicle speed VP the battery 2101. When the utilization mode of regenerated energy is set to the mode A2 and the SOC of the battery 2101 is equal to or larger than the first threshold th1 and is smaller than the second threshold th2, the braking torque ratio determination portion 2153 determines a ratio of braking torque generated in the mode A2 to braking torque generated by the mechanical brake 2118 (a braking torque ratio) according to the SOC of the battery 2101.

Figure 15:
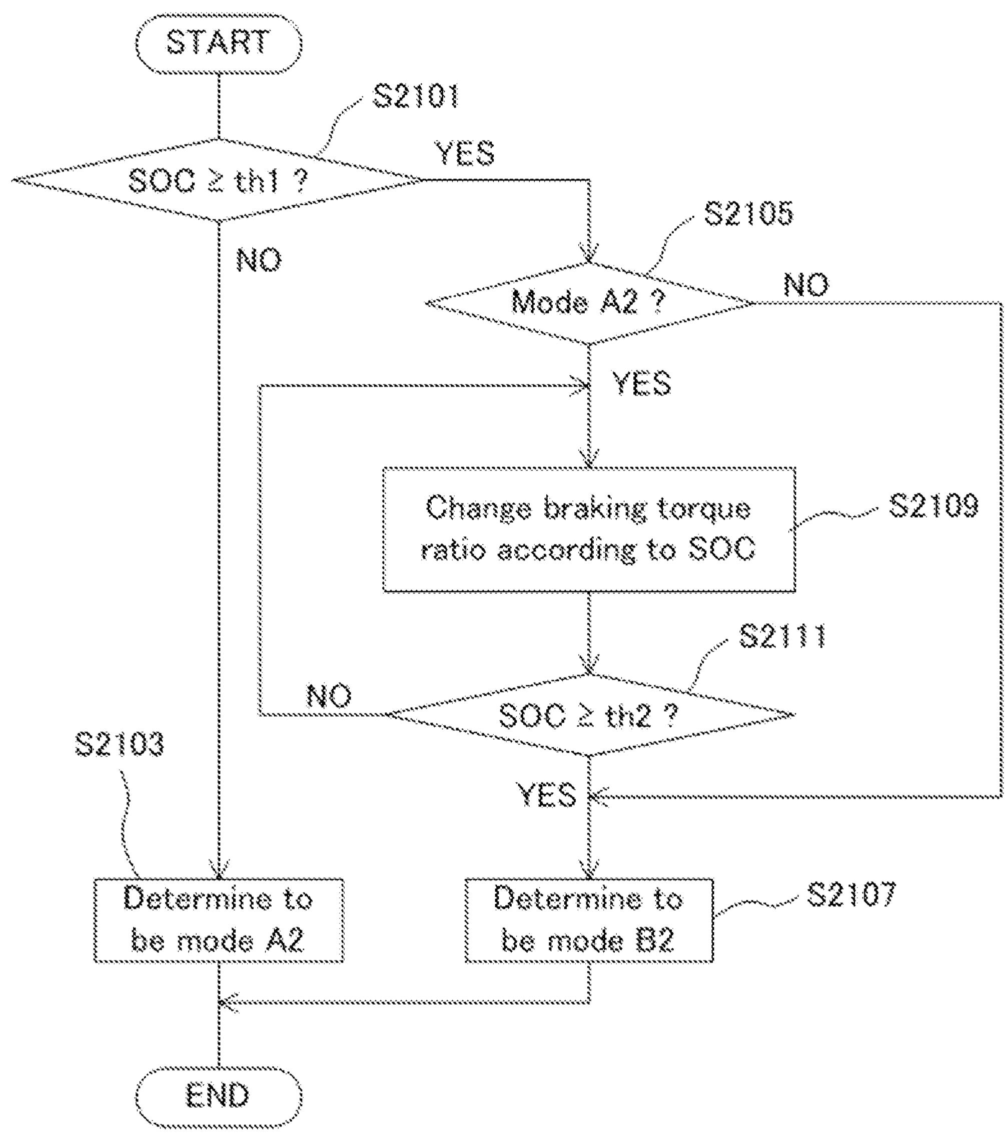
FIG. 15 is a flowchart showing an operation of the management ECU 2119 of the third embodiment when the vehicle is decelerated.

FIG. 15 is a flowchart showing an operation of the management ECU 2119 of the third embodiment when the vehicle is decelerated. As shown in FIG. 15, the utilization mode determination portion 2151 determines whether or not the SOC of the battery 2101 is equal to or larger than the first threshold th1 (SOC≥th1) (step S2101). Then, if it determines that SOC<th1, it proceeds to step S2103, whereas if it determines that SOC≥th1, it proceeds to step S2105. At step S2103, the utilization mode determination portion 2155 determines the utilization mode of the regenerated energy to be the mode A2. On the other hand, at step S2105, the braking torque ratio determination portion 2153 determines whether or not the utilization mode of regenerated energy is set to the mode A2. If it determines that the utilization mode is set to the mode A2, it proceeds to step S2107, whereas if it determines that the utilization mode is not set to the mode A2, it proceeds to step S2111.

At step S2107, the braking torque ratio determination portion 2153 changes the braking toque ratio according to the SOC of the battery 2101. Next, the utilization mode determination portion 2151 determines whether or not the SOC of the battery 2101 is equal to or larger than the second threshold th2 (SOC≥th2) (step S2109). Then, if it determines that SOC<th2, it returns to step S2107, whereas if it determines that SOC≥th2, it proceeds to step S2111. At step S2111, the utilization mode determination portion 2155 determines the utilization mode of the regenerated energy to be the mode B2.

Thus, as has been described heretofore, in this embodiment, the ratio of the braking torque generated by the mechanical brake 2118 is increased according to the SOC of the battery 2101 before the utilization mode of regenerated energy that is obtained by controlling the motor 2107 so as to perform the regenerative braking to obtain the braking force of the vehicle when the vehicle is decelerated is switched from the mode A2 to the mode B2, whereby the regenerated energy that is generated in the motor 2107 is limited. Thereafter, when a state results in which no regenerative energy is generated in the motor 2107, the utilization mode determination portion 2155 switches the utilization mode of regenerated energy to the mode B2 while holding the braking torque ratio. As shown in FIG. 13, the rotation speed Ne of the internal combustion engine 2109 then becomes constant without being affected by the deceleration realized by an operation of the brakes by the driver. Consequently, even though the SOC of the battery 2101 increases to approach a fully charged state while the vehicle is being decelerated, the vehicle is allowed to be decelerated without making the driver have inharmonious feeling.

Fourth Embodiment

Figures 16A, 16B, 16C:
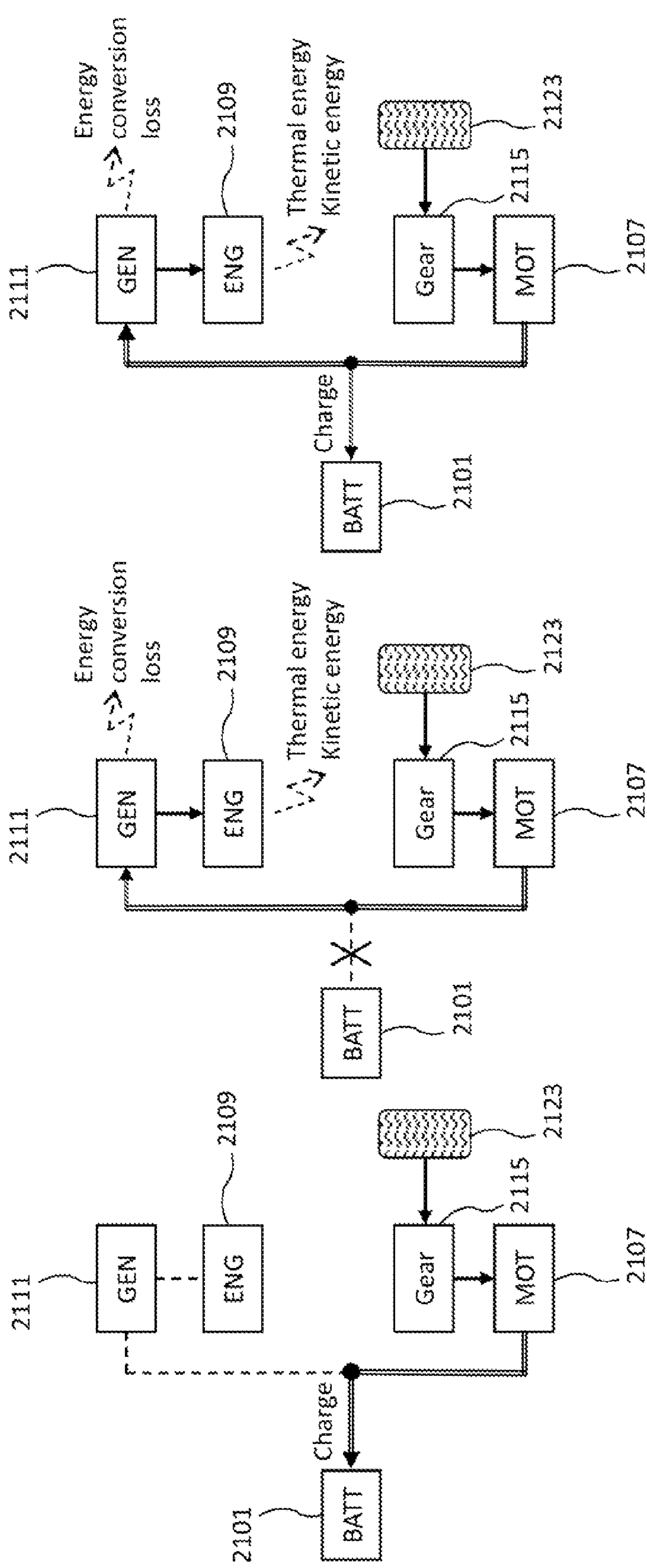
FIGS. 16A to 16C are diagrams showing utilization modes of regenerated energy that is generated by a regenerative control of a motor 2107 that is performed when a vehicle of a fourth embodiment is decelerated.

FIGS. 16A to 16C are diagrams showing utilization modes of regenerated energy that is generated by a regenerative control of a motor 2107 that is performed when a vehicle of a fourth embodiment is decelerated. In particular, FIG. 16A is a diagram showing a mode in which regenerated energy is used to charge the battery 2101. FIG. 16B is a diagram showing a mode in which the regenerated energy is used to drive a generator 2111 that then rotates an internal combustion engine 2109 as a load. FIG. 16C is a diagram showing a mode in which the regenerated energy is used by combining the mode shown in FIG. 16A and the mode shown in FIG. 16B. In FIGS. 16A to 16C, arrows indicated by a solid line indicate flows of torque, and arrows indicated by double lines indicate flows of electric power.

In the mode shown in FIG. 16A (hereinafter, referred to as a "mode A2"), a management ECU 2119 does not drive the generator 2111 by making a second inverter 2113 as shown in FIG. 11 inactive but activates a converter 2103. As a result, the regenerated energy that is generated by the regenerative control of the motor 2107 charges the battery 2101 or is stored in the battery 2101 as electrical energy. Namely, the regenerated electric power that is generated in the motor 2107 is stored in the battery 2101.

In the mode shown in FIG. 16B (hereinafter, referred to as a "mode B2"), the management ECU 2119 activates the second inverter 2113 to drive the generator 2111 but does not activate the converter 2103. As a result, the regenerated energy that is generated by the regenerative control of the motor 2107 is consumed to drive the generator 2111 that rotates the internal combustion engine 2109 as a load to which the supply of fuel is cut off. As this occurs, an energy conversion loss is generated in the generator 2111, and the internal combustion engine 2109 outputs thermal energy and kinetic energy.

In the mode shown in FIG. 16C (hereinafter, referred to as a "mode C2"), the management ECU 2119 activates the second inverter 2113 to drive the generator 2111 and also activates the converter 2103. As a result, part of the regenerated energy that is generated by the regenerative control of the motor 2107 charges the battery 2101 or is stored in the battery 2101 and the remainder is consumed to drive the generator 2111.

In the fourth embodiment, the management ECU 2119 determines the mode in which the regenerated energy that is generated in the motor 2107 is used from the modes A2 to C2 shown in FIGS. 16A to 16C, respectively, and also determines whether or not braking utilizing a mechanical brake 2118 is also used according to the SOC of the battery 2101 when the vehicle is decelerated.

Figure 17:
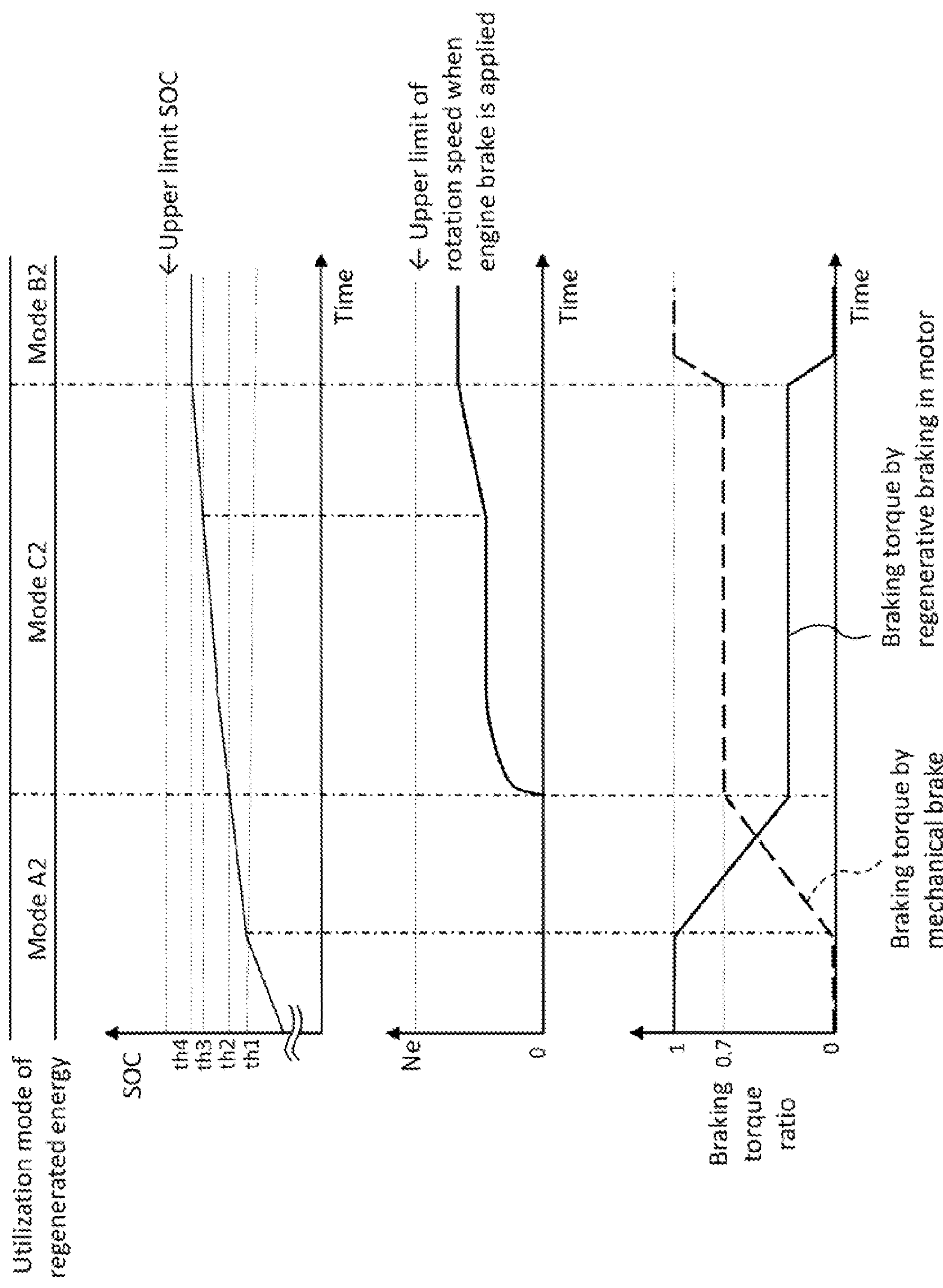
FIG. 17 is a graph showing an example of change with time of utilization modes of regenerated energy, SOC of a battery 2101, rotation speed Ne of an internal combustion engine 2109 and braking torque ratio when the vehicle of the fourth embodiment is decelerated constantly.

FIG. 17 is a graph showing an example of change with time of utilization modes of regenerated energy, SOC of the battery 2101, rotation speed Ne of the internal combustion engine 2109 and braking torque ratio when the vehicle of the fourth embodiment is decelerated constantly. Hereinafter, referring to FIG. 17, the control of the utilization mode of regenerated energy and the mechanical brake 2118 by the management ECU 2119 according to the fourth embodiment will be described.

As shown in FIG. 17, in the case the SOC of the battery 2101 is smaller than a first threshold th1, the management ECU 2119 controls so that the utilization mode of regenerated energy becomes the mode A2 shown in FIG. 16A when the vehicle is decelerated, and the vehicle is decelerated by braking torque generated in the mode A2. In the mode A2, the SOC is increased because the battery 2101 is charged. In the case the SOC of the battery 2101 becomes equal to or larger than the first threshold th1, the management ECU 2119 starts controlling the mechanical brake 2118 while keeping the utilization mode of regenerated energy in the mode A2. The first threshold th1 is an SOC value of the battery 2101 that enables the vehicle to cover a predetermined traveling distance.

After having started controlling the mechanical brake 2118, the management ECU 2119 changes a ratio of braking torque generated in the mode A2 to braking torque generated by the mechanical brake 2118 (hereinafter, referred to as a "braking torque ratio") according to the SOC of the battery 2101. As a result, a ratio of the braking torque generated by the mechanical brake 2118 to a whole of braking torque required increases gradually, and the amount of regenerated energy generated in the motor 2107 decreases. When the SOC of the battery 2101 reaches a second threshold th2, the management ECU 2119 controls the mechanical brake 2118 so that the braking torque generated by the mechanical brake 2118 can manage to occupy a predetermined percentage (70 percent in FIG. 17) of the whole of the braking torque required.

When the SOC of the battery 2101 reaches the second threshold th2, enabling the whole of the braking torque required to be covered by the braking torque generated by the mechanical brake 2118, the management ECU 2119 controls so that the utilization mode of regenerated energy becomes the mode C2 shown in FIG. 16C. As has been described above, the regenerated energy in the mode C2 is not only used to charge the battery 2101 but also is consumed to drive the generator 2111. Consequently, after the utilization mode of regenerated energy is controlled to become the mode C2 by the management ECU 2119, the SOC of the battery 2101 is increased.

Thereafter, when the SOC of the battery 2101 reaches a third threshold th3, the management ECU 2119 increases a regenerated energy component used to drive the generator 2111 as a utilization ratio of the regenerated energy in the mode C2. As a result, as shown in FIG. 17, the rotation speed Ne of the internal combustion engine increases, and the SOC of the battery 2101 also increases.

When the SOC of the battery 2101 reaches a fourth threshold th4, the management ECU 2119 controls the mechanical brake 2118 so that the braking torque generated by the mechanical brake 2118 can manage to cover the whole of the braking torque required and also controls so that the utilization mode of regenerated energy becomes the mode B2 shown in FIG. 12B. When the braking torque generated by the mechanical brake 2118 manages to cover the whole of the braking torque required, no regenerated energy is generated in the motor 2107. The regenerated energy in the mode B2 is consumed to drive the generator 2111, and therefore, the battery 2101 is not charged. Consequently, after the utilization mode of regenerated energy is controlled to become the mode B2 by the management ECU 2119, the SOC of the battery 2101 is not increased.

An internal configuration of the management ECU 2119 of the fourth embodiment is substantially the same as that shown in FIG. 14.

Figure 18:
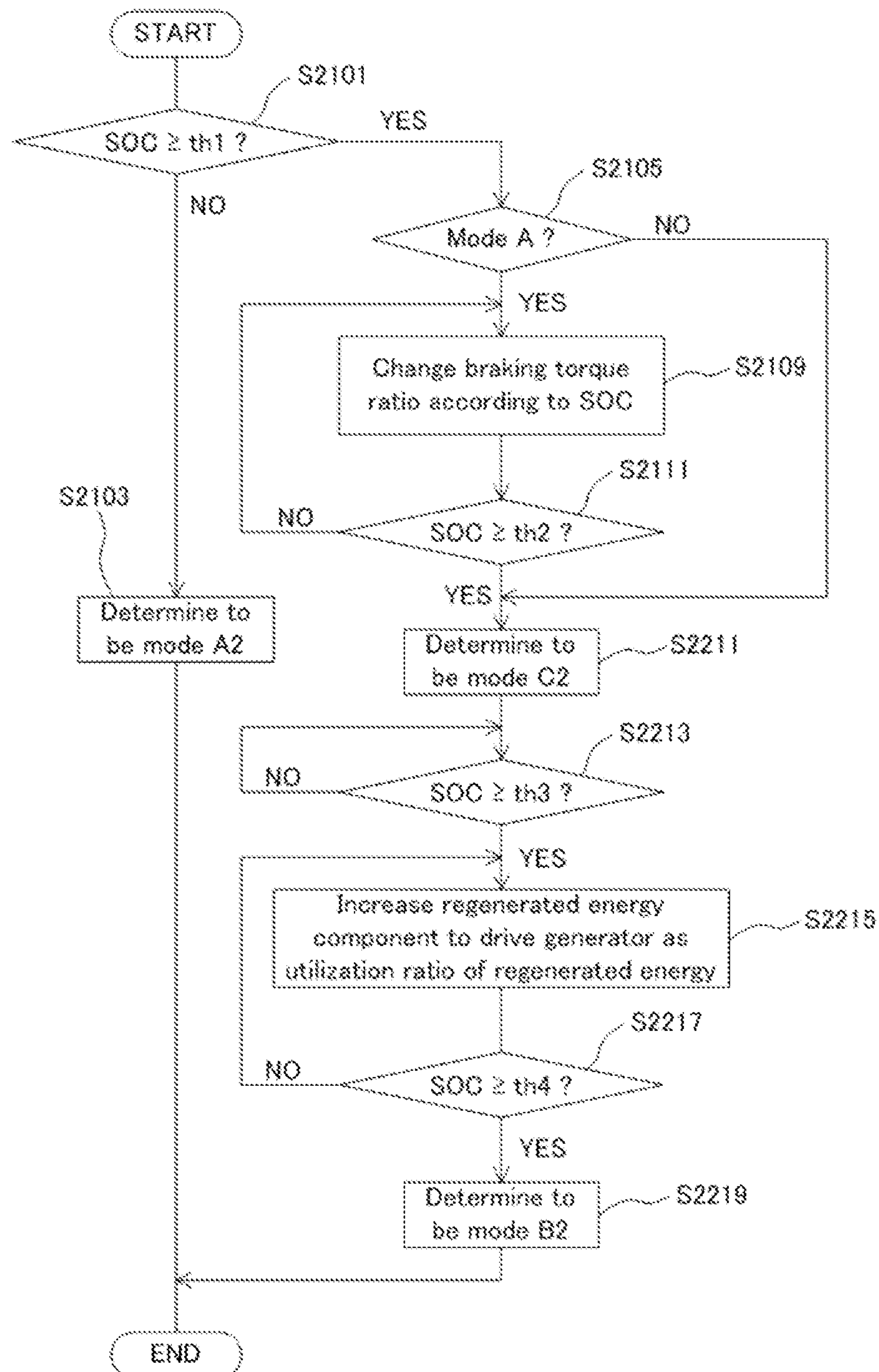
FIG. 18 is a flowchart showing an operation of a management ECU 2119 of the fourth embodiment when the vehicle is decelerated.

FIG. 18 is a flowchart showing an operation of the management ECU 2119 of the fourth embodiment when the vehicle is decelerated. In FIG. 18, like reference numerals are given to like steps to the steps shown in FIG. 15 in the third embodiment. As shown in FIG. 18, the utilization mode determination portion 2151 determines whether or not the SOC of the battery 2101 is equal to or larger than the first threshold th1 (SOC≥th1) (step S2101). Then, if it determines that SOC<th1, it proceeds to step S2103, whereas if it determines that SOC≥th1, it proceeds to step S2105. At step S2103, the utilization mode determination portion 2155 determines the utilization mode of the regenerated energy to be the mode A2. On the other hand, at step S2105, the braking torque ratio determination portion 2153 determines whether or not the utilization mode of regenerated energy is set to the mode A2. If it determines that the utilization mode is set to the mode A2, it proceeds to step S2107, whereas if it determines that the utilization mode is not set to the mode A2, it proceeds to step S2211.

At step S2107, the braking torque ratio determination portion 2153 changes the braking toque ratio according to the SOC of the battery 2101. Next, the utilization mode determination portion 2151 determines whether or not the SOC of the battery 2101 is equal to or larger than the second threshold th2 (SOC≥th2) (step S2109). Then, if it determines that SOC<th2, it returns to step S2107, whereas if it determines that SOC≥th2, it proceeds to step S2211. At step S2211, the utilization mode determination portion 2155 determines the utilization mode of the regenerated energy to be the mode C2.

After step S2211, the utilization mode determination portion 2151 determines whether or not the SOC of the battery 2101 is equal to or larger than the third threshold th3 (SOC≥th3) (step S2213). Then, if it determines that SOC≥th3, it proceeds to step S2215. The utilization mode determination portion 2151 controls so as to increase a regenerated energy component that drives the generator 2111 as a utilization ratio of the regenerated energy in the mode C2. Next, the utilization mode determination portion 2151 determines whether or not the SOC of the battery 2101 is equal to or larger than the fourth threshold th4 (SOC≥th4) (step S2217). Then, if it determines that SOC≥th4, it proceeds to step S2219. At step S2219, the utilization mode determination portion 2155 determines the utilization mode of the regenerated energy to be the mode B2.

Thus, as has been described heretofore, in this embodiment, the ratio of the braking torque generated by the mechanical brake 2118 is increased according to the SOC of the battery 2101 before the utilization mode of regenerated energy that is obtained by controlling the motor 2107 so as to perform the regenerative braking to obtain the braking force of the vehicle when the vehicle is decelerated is switched from the mode A2 to the mode B2, whereby the utilization mode of regenerated energy is switched to the mode C2 in such a state that the braking torque ratio remains high. As shown in FIG. 17, the rotation speed Ne of the internal combustion engine 2109 then becomes constant without being affected by the deceleration realized by an operation of the brakes by the driver. Further, in the case the SOC of the battery 2101 approaches a fully charged state with the rotation speed Ne of the internal combustion engine 2109 remaining constant, the regenerated energy component that drives the generator 2111 is controlled so as to be increased as the utilization ratio of regenerated energy, whereafter the utilization mode of regenerated energy is switched to the mode B2. In this way, the ratio of the braking torque generated by the mechanical brake 2118 changes in two stages, and therefore, a change rate per unit time can be reduced in switching from braking based on the regenerative braking in the motor 2107 to braking by the mechanical brake 2118. As a result, the vehicle is decelerated without making the driver have inharmonious feeling.

Figure 19:
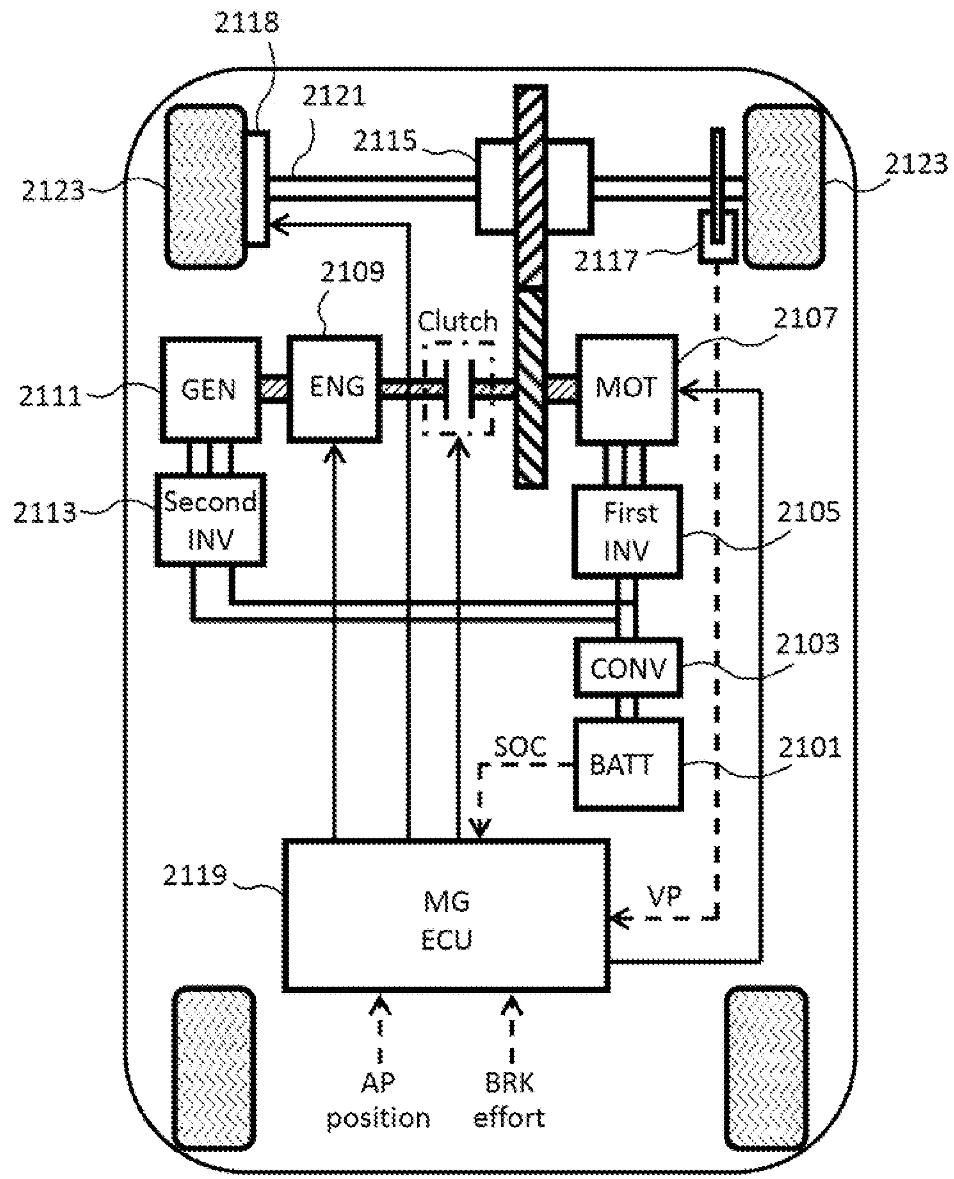
FIG. 19 is a block diagram showing an internal configuration of a series/parallel system HEV.
Figure 20:
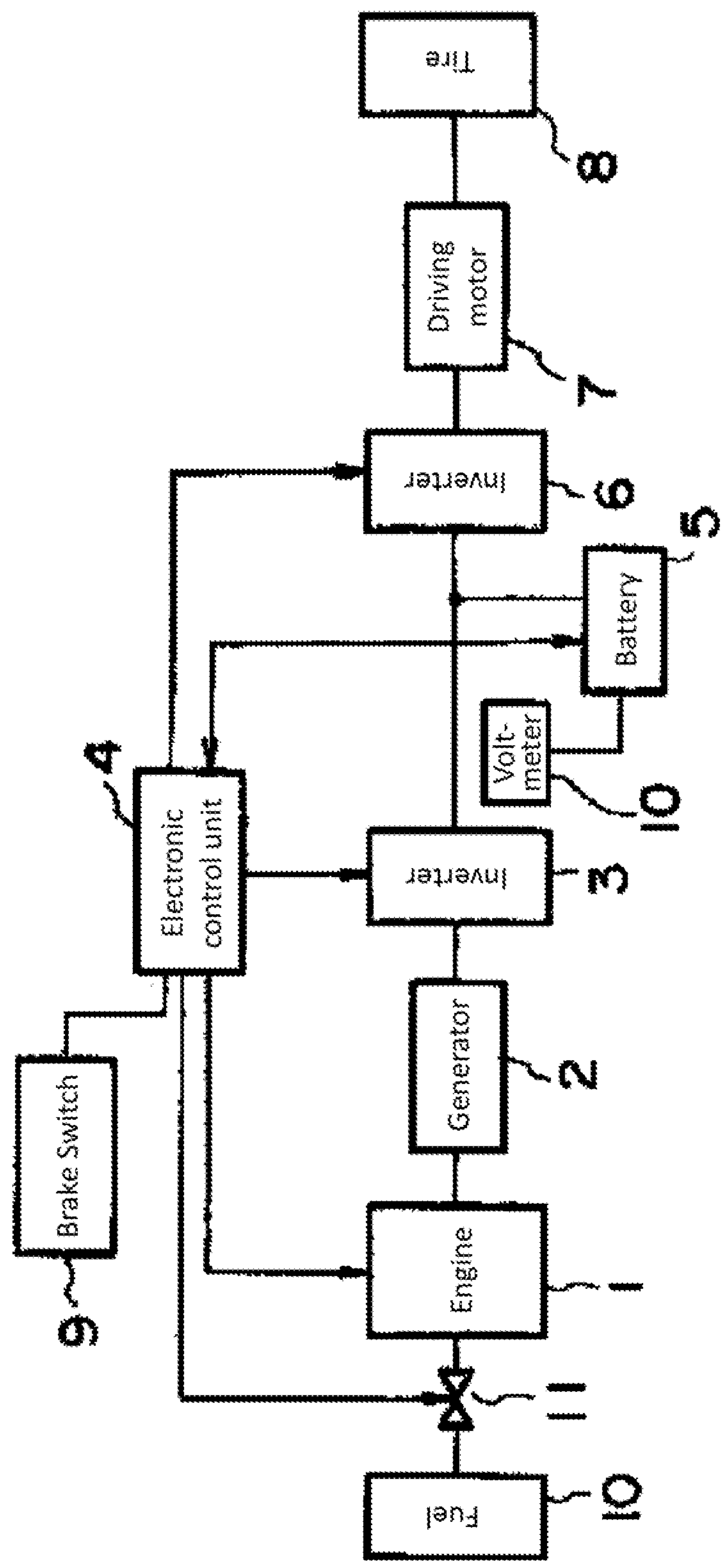
FIG. 20 is a block diagram of a regenerated energy absorbing system of a hybrid vehicle described in patent literature 1.

In the third embodiment and the fourth embodiment, while the invention is described as being applied to the series system HEV, the invention can also be applied to a series/parallel system HEV shown in FIG. 19.

While the invention has been described in detail and by reference to the specific embodiments, it is obvious to those skilled in the art to which the invention pertains that various alterations or modifications can be made thereto without departing from the spirit and scope of the invention.

This patent application is based on the Japanese Patent Application (No. 2012-200011) filed on Sep. 11, 2012 and the Japanese Patent Application (No. 2012-200012) filed on Sep. 11, 2012, the contents of which are incorporated herein by reference.

DESCRIPTION OF REFERENCE NUMERALS AND CHARACTERS

1101 battery (BATT)
1103 converter (CONV)
1105 first inverter (first INV)
1107 motor (Mot)
1109 internal combustion engine (ENG)
1111 generator (GEN)
1113 second inverter (second INV)
1115 gearbox (gear)
1117 vehicle speed sensor
1119 management ECU (MG ECU)
1121 drive shaft
1123 drive wheel
1151 driving acceleration calculation portion
1153 driving condition determination portion
1155 utilization mode determination portion
1157 utilization ratio control portion
1159 utilization condition designation portion

2101 battery (BATT)
2103 converter (CONV)
2105 first inverter (first INV)
2107 motor (MOT)
2109 internal combustion engine (ENG)
2111 generator (GEN)
2113 second inverter (second INV)
2115 gearbox (gear)
2117 vehicle speed sensor
2118 mechanical brake
2119 management ECU (MG ECU)
2121 drive shaft
2123 drive wheel
2151 utilization mode determination portion
2153 braking torque ratio determination portion

The invention claimed is:

1. A hybrid vehicle, comprising:

a rechargeable battery which supplies electric power to a motor that is a drive source of the hybrid vehicle;

an internal combustion engine;

a generator which supplies electric power generated by means of power from the internal combustion engine to the motor or the battery;

the motor which is driven by electric power from at least one of the battery and the generator; and a control unit which controls a drive of the hybrid vehicle that is driven by power from at least one of the motor and the internal combustion engine, wherein the control unit comprises:

a utilization mode determination portion which determines a utilization mode of regenerated energy in the hybrid vehicle, according to a charged ratio of the battery and a braking force of the hybrid vehicle, from among a first mode in which the regenerated energy is charged in the battery, a second mode in which the regenerated energy is consumed to drive the generator with the internal combustion engine as a load, and a third mode in which a part of the regenerated energy is charged in the battery and the remainder is consumed to drive the generator; and a utilization ratio control portion which controls a utilization ratio of the regenerated energy in order that a portion of the regenerated energy that is used to drive the generator increases gradually as the charged ratio of the battery increases, when the utilization mode of the regenerated energy is the third mode, wherein the utilization mode determination portion determines the utilization mode of the regenerated energy to be the third mode in a case, when the charged ratio of the battery is equal to or larger than a first threshold, where a braking force of a naturally decelerating hybrid vehicle is higher than a limit of a braking force of the decelerating hybrid vehicle that is realized in the second mode.

2. The hybrid vehicle according to claim 1, wherein when the hybrid vehicle decelerates and descends a falling slope, the control unit controls the braking force of the hybrid vehicle in order that the braking force is increased according to a gradient of the slope, and when the charged ratio of the battery is equal to or larger than the first threshold, the braking force controlled to be increased of the hybrid vehicle where the utilization mode of the regenerated energy is determined to be the first mode is restricted to be equal to or smaller than the limit of the braking force of the hybrid vehicle that is realized in the second mode.

3. The hybrid vehicle according to claim 1, comprising two shift ranges having different braking forces when the hybrid vehicle naturally decelerates on a falling slope, wherein the utilization mode determination portion determines the utilization mode of the regenerated energy to be the third mode when a shift range having a larger braking force is selected.

4. The hybrid vehicle according to claim 1, wherein the utilization mode determination portion determines the utilization mode of the regenerated energy to be the second mode when the charged ratio of the battery is equal to or larger than a second threshold that is higher than the first threshold.

5. The hybrid vehicle according to claim 1, comprising a braking unit which mechanically generates a braking force of the hybrid vehicle, wherein when the utilization mode of the regenerated energy of the decelerating hybrid vehicle is the first mode, the control unit increases a ratio of a braking force component by the braking unit out of a braking force of the hybrid vehicle so as to limit a braking force component by the first mode and thereafter changes the utilization mode of the regenerated energy to the second mode or the third mode, when the charged ratio of the battery is equal to or larger than a first threshold.

6. The hybrid vehicle according to claim 5, wherein when the braking force component by the first mode is limited, the control unit increases the ratio of the braking force component by the braking unit according to an increase of the charged ratio of the battery whereas decreasing an amount of the regenerated energy that is generated in the motor.

7. The hybrid vehicle according to claim 6, wherein in a case where the amount of the regenerated energy that is generated in the motor become 0, the utilization mode determination portion determines the utilization mode of the regenerated energy to be the second mode.

8. The hybrid vehicle according to claim 6, wherein in a case where a predetermined ratio of a whole braking force of the hybrid vehicle can be obtained by the braking unit, the utilization mode determination portion determines the utilization mode of the regenerated energy to be the third mode.

9. The hybrid vehicle according to claim 8, wherein when the charged ratio of the battery reaches a second threshold that is higher than the first threshold, the control unit controls a utilization ratio of the regenerated energy in the third mode in order that a ratio used to drive the generator gradually increases.

10. The hybrid vehicle according to claim 9, wherein when the charged ratio of the battery reaches a third threshold that is higher than the second threshold, the control unit increases the ratio of the braking force component by the braking unit, and the utilization mode determination portion determines the utilization mode of the regenerated energy to be the second mode.

11. The hybrid vehicle according to claim 5, wherein a rotation speed of the internal combustion engine is constant after the utilization mode of the regenerated energy is changed to the second mode or the third mode.

12. The hybrid vehicle according to claim 1, wherein when the charged ratio of the battery is smaller than a first threshold, the utilization mode determination portion determines the utilization mode of the regenerated energy to be the first mode.

* * * * *